US011615096B2

(12) United States Patent
Colomban

(10) Patent No.: US 11,615,096 B2
(45) Date of Patent: *Mar. 28, 2023

(54) EVENT AND/OR LOCATION BASED MEDIA CAPTURE AND UPLOAD PLATFORM BASED ON A URL OR A LINK ASSOCIATED WITH A MACHINE-READABLE OPTICAL LABEL

(71) Applicant: Dean Francis Colomban, Mount Laurel, NJ (US)

(72) Inventor: Dean Francis Colomban, Mount Laurel, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,068

(22) Filed: Jul. 4, 2022

(65) Prior Publication Data

US 2023/0025580 A1 Jan. 26, 2023

Related U.S. Application Data

(63) Continuation of application No. 17/384,710, filed on Jul. 24, 2021, now Pat. No. 11,379,484.

(51) Int. Cl.
*G06F 16/2455* (2019.01)
*H04L 65/401* (2022.01)
*G06Q 10/109* (2023.01)

(52) U.S. Cl.
CPC ..... *G06F 16/24556* (2019.01); *G06Q 10/109* (2013.01); *H04L 65/4015* (2013.01)

(58) Field of Classification Search
None
See application file for complete search history.

(56) References Cited

U.S. PATENT DOCUMENTS

| | | | | |
|---|---|---|---|---|
| 7,966,369 | B1* | 6/2011 | Briere | G06F 40/174 709/204 |
| 2016/0110669 | A1* | 4/2016 | Iyer | G06Q 10/06315 705/7.25 |
| 2016/0162172 | A1* | 6/2016 | Rathod | G06F 9/451 715/747 |
| 2016/0191653 | A1* | 6/2016 | Aluotto | G06Q 50/01 709/205 |
| 2016/0210602 | A1* | 7/2016 | Siddique | G06Q 20/321 |
| 2020/0167699 | A1* | 5/2020 | Cohen | H04L 51/52 |
| 2021/0097630 | A1* | 4/2021 | Whilby | G06F 16/587 |

* cited by examiner

*Primary Examiner* — Quang N Nguyen
(74) *Attorney, Agent, or Firm* — Ashok Tankha

(57) ABSTRACT

A computer-implemented method and a media acquisition system (MAS) for accessing media from attendees of an event are provided. The MAS receives registration and event details from an organizer of the event and generates an online portal with media request elements. The MAS generates a shareable link to the online portal in multiple formats for rendering the shareable link to the attendees. The MAS displays the online portal on electronic devices of the attendees that access the online portal through the shareable link in one of the formats. The MAS acquires media from the electronic devices of the attendees agreeing to share the media with the organizer through a live media capture or an access of stored media. The MAS analyzes the acquired media according to organizer preferences and shares a selection of the analyzed media on preselected social media platforms on receiving a corresponding request from the organizer.

23 Claims, 9 Drawing Sheets

| # | Full Name | Email | Sharing | Status | Permission | Date |
|---|---|---|---|---|---|---|
| 1 | Efgh<br>Delete \| View Files(s) | efgh@efg.com | | Pending Review<br>Publish | On | 2021/05/21<br>6:26 am |
| 2 | Abcd | abcd@abc.com | | Approved | On | 2021/05/21<br>6:26 am |
| 3 | Pqrs | pqrs@def.com | | Unavailable | Off | 2021/05/21<br>6:26 am |
| 4 | Mnop | mnop@ghi.com | | Rejected | On | 2021/05/21<br>6:26 am |

Showing 1 to 10 of 10 entries

Search:

FIG. 8

EVENT AND/OR LOCATION BASED MEDIA CAPTURE AND UPLOAD PLATFORM BASED ON A URL OR A LINK ASSOCIATED WITH A MACHINE-READABLE OPTICAL LABEL

CROSS-REFERENCE TO RELATED APPLICATIONS

This application claims priority to and the benefit of the non-provisional patent application titled "Event And/Or Location Based Media Capture And Upload Platform Based On A URL Or A Link Associated With A Machine-Readable Optical Label", application Ser. No. 17/384,710, filed in the United States Patent and Trademark Office on Jul. 24, 2021. The specification of the above referenced patent application is incorporated herein by reference in its entirety.

BACKGROUND

Events are conducted the world over in offline, online, and mixed formats for innumerable occasions. Most of the events involve creation of media by participants for purposes ranging from capturing memories of their participation in the event for posterity to reporting on the event to the masses. With one or more of smartphones, digital cameras, voice recorders, and other recording devices in the hands of almost every attendee at any event, the number of media generated at any event is substantially large. Oftentimes, an organizer of an event attempts to or would like to collect media such as images, photos, and videos captured by attendees of the event to store them as memories, showcase them at offices or other places, or use them along with reviews of the event for marketing purposes. Media collection typically involves requesting the attendees to share the media with the organizer personally, or to send the media over to an electronic mail (email) address, to a cloud storage system, or to send physical copies of the media by mail or through a postal service. These conventional methods of media collection require significant effort and time from the organizer who usually lacks the same prior to or during the event. Typically, the organizer has to reach out to the attendees after the event, assuming the organizer has the addresses at which the attendees could be reached or the means to do so in the first place. As such, the organizer may miss out on media generated by the attendees and quite often has to be satisfied with merely the media the organizer himself or herself generated or had professionals generate for them at the event.

Moreover, for attendees of an event who have been approached by the organizer to share the media that the attendees generated in association with the event, the process of proactively selecting the media from their electronic devices and composing an email or uploading the media to a cloud storage system by logging in to a platform after the event entails substantial effort from the attendees after their enthusiasm of the event has simmered down. Many attendees may not consider selecting and sharing the media worth their time and effort. This again leaves the organizer of the event in the lurch when it comes to accessing media generated by the attendees of his or her event. With technology in its current state, the ease of getting things done and even full-blown automation are feasible in many scenarios. However, current usage of technology in the scenario of an event is either lax, leaving too much to be done by attendees, thereby putting them off, or high-handed, involving a mandatory agreement by attendees to forgo media they may otherwise not wish to share for any reason.

Hence, there is a long-felt need for a method and a system to prepare for aggregation of media from attendees of an event in a central location for easy access by an organizer of the event prior to the event with minimal investment of effort and time to reduce any form of friction involved later on. Furthermore, there is a need for a method and a system that makes it easy and appealing to attendees of an event to share media comprising, for example, photos, audio, and videos, with an organizer of the event, reminding them at the event itself to avoid having to be troubled after the event has passed.

SUMMARY

This summary is provided to introduce a selection of concepts in a simplified form that are further disclosed in the detailed description. This summary is not intended to determine the scope of the claimed subject matter.

The computer-implemented method and the system disclosed herein address the above-recited need for preparing for aggregation of media from attendees of an event in a central location for easy access by an organizer of the event prior to the event with minimal investment of effort and time from the organizer. Furthermore, the computer-implemented method and the system disclosed herein make it easy and appealing to attendees of an event to share media comprising, for example, photos, audio, and videos, with the organizer of the event, allowing creation of media from within the system or quick uploading of already created media without needing to login or navigate to and within media sharing websites, cloud platforms, or electronic mail (email) service platforms. The computer-implemented method and the system disclosed herein allow the attendees to share the media at the event itself to avoid having to trouble the attendees for the media after the event has passed.

The computer-implemented method and the system disclosed herein employ a media acquisition system executable by at least one processor configured to execute computer program instructions for accessing media from attendees of an event. The media acquisition system receives registration and event details from an organizer of the event. The media acquisition system generates an online portal specific to the event and the organizer based on the received registration and event details with media request elements. The online portal is accessible over a network to the organizer and to users with information on the location of the online portal on the network. The media acquisition system generates a shareable link to the generated online portal in multiple formats for rendering the generated shareable link to the attendees of the event, including options for the shareable link to be generated in machine-readable optical label formats that are easily scannable with mobile electronic devices for fast access to the online portal. The shareable link comprises information on the location of the online portal on the network. The media acquisition system displays the generated online portal on electronic devices of the attendees of the event that access the generated online portal through the generated shareable link in one of the formats.

The media acquisition system acquires media from the electronic devices of the attendees of the event agreeing to share the media with the organizer via the media request elements on the displayed online portal through a live capture of the media or an access of stored media with an optional media enhancement. The media acquisition system allows multiple attempts by the attendees at the live capture and the choice of stored media before acquiring the media from the electronic devices. The media acquisition system analyzes the acquired media based on characteristics of the acquired media comprising, for example, metadata, persons in the media recognized using face recognition algorithms, social media profiles of the recognized persons in cases where those persons have shared their details with the media acquisition system, etc., in accordance with preconfigured organizer preferences received as part of the event details. The media acquisition system shares a selection of the analyzed media on social media platforms preselected by the organizer of the event on receiving a corresponding request from the organizer. The request from the organizer received by the media acquisition system comprises the selection of the analyzed media that is to be shared.

In one or more embodiments, related systems comprise circuitry and/or programming for executing the methods disclosed herein. The circuitry and/or programming are any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

FIG. 8 exemplarily illustrates a graphical user interface that the media acquisition system renders on an electronic device of an organizer of an event for sharing media from the event.

DETAILED DESCRIPTION

Disclosed herein is a computer-implemented method and a system for accessing media from attendees of an event. As used herein, the term "media" refers to content in different combined and individual formats, for example, audio, video, audiovisual, animations, and rich content formats. The media comprises, for example, audio content, video content, music content such as a song, gaming content, etc., and any combination thereof. Also, as used herein, the term "event" refers to any activity involving more than one person that is planned for a purpose. Examples of events, as used herein, comprise anniversary parties, bar and bat mitzvahs, school events, religious and church events, block parties, class reunions, family reunions, family or group trips or travels, fashion shows, graduation parties, promotional events, retirement events, social gatherings, sweet sixteen parties, grand openings, team building activities, themed parties, birthday parties, corporate meetings, business or industry/technology conferences, weddings, pre-event and/or post-event events and any other planned activities. For example, for events such as funerals and memorials, it would be a "pre-event" to gather video for the funeral or the memorial event itself. The computer-implemented method and the system disclosed herein employ a media acquisition system executable by at least one processor configured to execute computer program instructions for accessing media from attendees of an event. The media acquisition system provides a platform where a person attending an event is allowed, for example, to scan an optical label such as a quick response code (QR code®), a barcode, etc., or access a uniform resource locator (URL) directly to be directed to a webpage on the Internet specific to the event and record a video or upload and share videos and images from the event with an organizer of the event.

Figure 1:
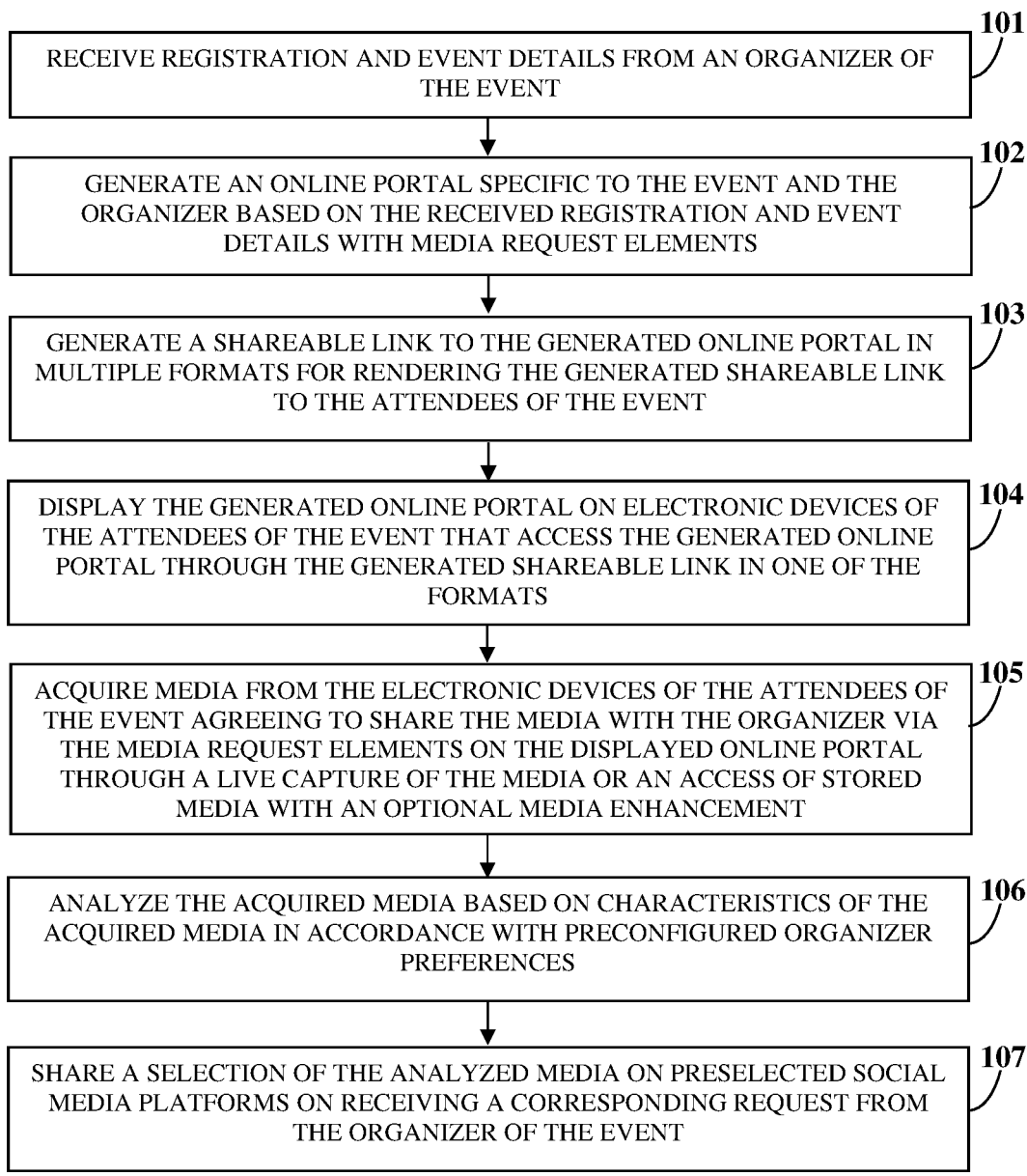
FIG. 1 illustrates a method for accessing media from attendees of an event.

FIG. 1 illustrates a method for accessing media from attendees of an event. The media acquisition system receives 101 registration and event details from an organizer of the event. In various embodiments, the media acquisition system receives the event details through a webpage via a browser application, or through a standalone application on an electronic device of the organizer, or through electronic mail (email), or through a graphical user interface (GUI) that the media acquisition system renders on the electronic device of the organizer. The media acquisition system is accessible for interaction with the organizer of the event through input devices, for example, a keyboard such as an alphanumeric keyboard, a joystick, a pointing device such as a computer mouse, a touch pad, a digital pen, a microphone for providing voice input, a physical button, a touch sensitive display device, a track ball, a pointing stick, any device capable of sensing a tactile input, etc., activated by touch and/or voice commands. The registration details comprise, for example, credentials for the media acquisition system to identify the organizer on subsequent accesses of the media acquisition system by the organizer. The media acquisition system renders a number of event type templates for different types of events to allow the organizer to provide the event details. The event type templates comprise, for example, wedding templates, birthday party templates, corporate event templates, graduation event templates, Independence Day templates, etc. The media acquisition system also allows the organizer to select a general template for providing the event details. The event type templates further comprise humorous templates, for example, templates that convey a message such as "congratulate me, I'm finally divorced!".

The media acquisition system generates 102 an online portal specific to the event and the organizer based on the received registration and event details with media request elements. The online portal is accessible over a network to the organizer and to users with information on the location of the online portal on the network. The generated online portal comprises editing tools for portrayal of event information and a selection of multiple layouts to showcase the event to visitors of the online portal. The visitors of the online portal are, for example, the attendees of the event. The editing tools allow portrayal of the event information, for example, as text in a selection of fonts, sizes, and styles such as varied typography, shapes of parts of textual content, effects including shadows, outlines, color, etc., or as audio clippings, videos, images, animation, augmented reality (AR) and/or virtual reality (VR) objects, custom visual effects, etc., or any combination thereof. The generated online portal provides a selection of multiple layouts to arrange data of the event information in a way deemed fit or appealing by the organizer of the event.

The media request elements are software constructs that use established protocols for a secure transfer of files and user-entered data from electronic devices interacting with them on the online portal. The media request elements comprise, for example, textual data, audio data, video data, animation, or other data configured to guide users of the electronic devices through the transfer of files and user-entered data. The media request elements appeal, via the portrayal of the event information, to the visitors of the online portal to record or share media related to the event with the organizer, for example, through clickable links that request access to media capture devices and data storage devices on electronic devices that the visitors of the online portal use to access the online portal. When the organizer uses the editing tools to make edits, the media acquisition system generates the online portal again incorporating the edits over the previously generated online portal. Consider an example where an organizer of an event signs up with the media acquisition system by providing registration details to create an account specific to the organizer, and using event details, has the media acquisition system generate an event webpage. The organizer then uploads an event image and writes a paragraph about the event, while arranging and editing the image and the text using the editing tools on the event webpage generated by the media acquisition system.

The event type templates that the organizer of the event uses to provide the event details to the media acquisition system provide a basis for the event details and include elements such as font type, font size, font color, image border types, and additional page design elements that can be used for free or bought for a fee to assist the organizer in encapsulating the event details for the media acquisition system to use in the generation of the online portal. For example, the event type templates comprise provisions for entering a title for the event and a paragraph or two of text about the event that the organizer would like the attendees of the event to peruse to instruct them on media files the organizer would like to receive. Via the event type templates, the media acquisition system allows the organizer to select a time period for the generated online portal to be available for attendees to access as well as the date of the event. After the generation of the online portal, the media acquisition system allows the organizer to make changes to the generated online portal using the editing tools till the organizer finds a final generated online portal to be satisfactory.

The media acquisition system generates 103 a shareable link to the generated online portal in multiple formats for rendering the generated shareable link to the attendees of the event. The shareable link comprises information on the location of the online portal on the network. The formats of the shareable link to the generated online portal comprise, for example, a uniform resource locator (URL), an optical label such as a QR code® or a barcode, an augmented reality (AR) code, etc., along with information that the organizer of the event wants to accompany the location information of the online portal on the network. In an embodiment, the information accompanying the location information of the online portal optionally comprises design elements that the organizer of the event chooses to include using the editing tools on the generated online portal. The media acquisition system provides the organizer of the event with choices on different methods of sharing the online portal with the attendees of the event. For example, the media acquisition system allows the organizer to generate optical labels such as QR codes® or barcodes, that link directly to the online portal in templates of different types and sizes such as business-card sizes, table sign-holder sizes, table assignment cards, flyers, and other styles and sizes. The media acquisition system also provides options to share a uniform resource locator (URL) of the online portal with the attendees of the event, for example, via emails, text messages, messages on social media platforms, multimedia messages, chat messages, etc., through the Internet, a local area network (LAN), or a telecommunication channel. The shareable link in its multiple formats further comprises textual content, audio content, video content, animation, or other media content, and design elements to accompany the location information of the online portal on the network to appeal to the attendees of the event to engage with the online portal, in turn increasing engagement of the attendees with the event.

The media acquisition system displays 104 the generated online portal on electronic devices of the attendees of the event that access the generated online portal through the generated shareable link in one of the formats. The media acquisition system renders the display of the online portal in compatibility with the type of electronic device accessing the online portal. For example, the media acquisition system takes into account whether the electronic device is a mobile phone, or a desktop, or a laptop computer while rendering the display of the online portal to ensure a smooth user experience in viewing and navigating the online portal. In an embodiment, the media acquisition system renders the display of the online portal on a browser application or a standalone application on the electronic device. Furthermore, if the organizer of the event has used augmented reality (AR) and/or virtual reality (VR) elements in the generated online portal, the media acquisition system checks the electronic device for AR and VR capabilities and where present, renders the display accordingly. For example, the media acquisition system renders VR objects in VR headsets accessing the online portal.

The media acquisition system acquires 105 media from the electronic devices of the attendees of the event agreeing to share the media with the organizer via the media request elements on the displayed online portal through a live capture of the media or through an access of stored media with an optional media enhancement. The media acquisition system comprises media tools that access media capture devices, for example, cameras, microphones, screen capture cards, or other digital processing hardware and data storage devices comprising memory storage units on electronic devices with permission from users of the electronic devices. The online portal displayed on the electronic devices of the attendees of the event comprises messages encouraging capture or upload of media, as part of the media request elements, from the attendees of the event viewing the online portal. When the attendees engage with the media request elements, thereby agreeing to share the media with the organizer of the event, the media acquisition system activates the media tools to acquire the media from the electronic devices. The media acquisition system allows multiple attempts at capturing media till the attendees of the event are satisfied with the captured media before making the captured media available to the organizer of the event. The media acquisition system also allows attendees to change their choice of stored media before acquiring the media from the electronic devices. For example, the attendees may re-record a video or an audio message or change their choice of media on their electronic devices to be uploaded to the media acquisition system. The attendees do not have an overhead of having to create an account or otherwise interact with the media acquisition system to share the media with the organizer of the event. The media acquisition system offers minimal resistance or hurdles to the attendees in sharing media with the organizer to facilitate a hassle-free media sharing experience for the attendees of the event.

The media acquisition system analyzes 106 the acquired media based on characteristics of the acquired media in accordance with preconfigured organizer preferences. The preconfigured organizer preferences are part of the received event details. The characteristics of the acquired media comprise data that is only collected where this data is legally obtainable and based on terms of service and a privacy policy agreed to by the attendees of the event sharing their media with the organizer of the event using the media acquisition system. The data in the characteristics of the acquired media comprise technical metadata and content metadata of the uploaded media, for example, attributes about the media such as its height and width, pixels, type of compression, author or name of the photographer, and date and time the media was created. Moreover, the data in the characteristics of the acquired media comprise metadata, for example, length or duration of the media, time of capture, location of capture of the media, audio/video quality, etc., persons in the media recognized via face recognition algorithms in the media acquisition system, social media profiles of the recognized persons in cases where such details, among other details, have been shared with the media acquisition system with permission from the corresponding persons, etc. In an embodiment, the media acquisition system performs online tracking of the electronic devices used by the attendees to upload the media. Data collected by the media acquisition system for online tracking comprise, for example, details of the operating system, screen resolution, browser and browser version, language, global positioning system (GPS) location, time zone, and a reverse Internet Protocol (IP) address lookup to determine internet service providers if possible. The online tracking further comprises using cookies for page-to-page or site-to-site user activity tracking when accessing the generated online portal and other first and third-party tracking.

The preconfigured organizer preferences comprise preconfigured enhancement of the acquired media, for example, increase of contrast of images, application of filters to videos or images, transcription of audio, etc., and selected organization of media according to criteria such as length of the media, time of acquisition, attendees from whom the media is acquired, etc. Moreover, the preconfigured organizer preferences comprise requests for extraction of data comprising, for example, information on persons recognized in the media through face recognition algorithms and relationships between the attendees sharing the media with the organizer determined via artificial intelligence and machine learning algorithms utilizing details furnished by the attendees or the organizer with permission from the attendees. Furthermore, the preconfigured organizer preferences comprise requests for sorting through the acquired media and grouping media showing common elements such as banners, posters, etc., used in the event after identifying the common elements using artificial intelligence and machine learning algorithms, for example, for marketing future instances of the event. In instances where the acquired media is altered, for example, through applied enhancements to the media, during the analysis, the media acquisition system creates a copy of the acquired media to retain the original media along with the altered version of the media.

The media acquisition system shares 107 a selection of the analyzed media on social media platforms preselected by the organizer of the event on receiving a corresponding request from the organizer. The request from the organizer received by the media acquisition system comprises the selection of the analyzed media that is to be shared. The media acquisition system renders a graphical user interface (GUI) on an electronic device used by the organizer of the event to access the media acquisition system. The media acquisition system validates the received registration details prior to generating the online portal to identify the organizer and renders the GUI that incorporates functions to organize and share the analyzed media. While the media acquisition system allows an attendee of the event to view only the media acquired from their electronic device, the media acquisition system allows the organizer to view, organize, and share all the acquired and analyzed media. The media acquisition system analyzes the acquired media and shares the analyzed media based on permissions received from the attendees sharing the media during the acquisition of the media by the media acquisition system. In an embodiment, the media acquisition system requests the attendees sharing the media to agree with terms and conditions set for usage of the media acquisition system. The set terms and conditions outline rights of the organizer of the event, for example, to use the media for social and marketing activities. Based on preferences of the organizer of the event, in an embodiment, the media acquisition system shares the analyzed media with selected attendees of the event, or all the attendees, or third parties based on terms and conditions agreed by the attendees of the event. The media acquisition system provides the organizer with options to connect social media websites to the media acquisition system for automatic posting of media that has been approved by the organizer to the connected social media websites. Moreover, the media acquisition system provides the organizer of the event with an option to automate the sharing of the analyzed media to a private repository on a data storage location on a system employing the media acquisition system or at a preconfigured location on a network.

The media acquisition system analyzes the acquired media using artificial intelligence and machine learning algorithms to enhance the utility of the acquired media and to facilitate an improved experience for the organizer and the attendees of the event. During the analysis, in an embodiment, the media acquisition system also analyzes media acquired from the organizer of the event, thereby merging the media acquired from the attendees of the event with the media acquired from the organizer. In an embodiment, the media acquisition system allows the organizer of the event to add data fields to the generated online portal as a submission form at their own discretion while making edits. The media acquisition system acknowledges the added data fields by generating an updated online portal with the edits. The media acquisition system displays the submission form on the generated online portal on electronic devices of the attendees of the event that access the online portal through the shareable link. The submission form, via the data fields, requests information from the attendees. In an embodiment, the media acquisition system suggests to the organizer of the event a list of popular data fields that can be added to the submission form. For example, an organizer of a church event, or a business or industry/technology conference, or a team-building event may want to ask particular questions at their own discretion when the media is being uploaded by attendees of the event. A submission form may ask how the attendees are feeling currently, whether they enjoyed the event, or may ask the attendees to provide more demographic based information such as a physical address to allow the organizer of the event to inform people from certain areas of future events in their area, or ask the attendees if they would like to join a mailing list of the organizer for future events. In another example, at a wedding, the bride and groom may use the submission form to ask on which side of the family an attendee belongs so they could share or group acquired photos based on additional data they would like to collect for the event.

The analysis of the acquired media comprises organizing, enhancing, selectively highlighting, tagging, and applying image recognition to the acquired media; creating montages, three-dimensional models, and augmented reality objects from the acquired media, and exhibiting the characteristics of the acquired media. In an embodiment, the media acquisition system analyzes the acquired media to group attendees who may know each other and suggest photos and videos where they occur together to them by sharing the analyzed media with those attendees. In an exemplary illustration, consider a scenario where attendees of an event have shared their social media profile handles with the media acquisition system through a submission form while uploading media to the media acquisition system via the media request elements on the online portal generated by the media acquisition system. The media acquisition system, while analyzing the acquired media, determines that two or more attendees portrayed in a media item are friends based on their social media profiles. Then, according to the preconfigured organizer preferences, media acquired from other attendees where these two or more attendees feature together may be shared with each of these two or more attendees, thereby incentivizing and encouraging participation in sharing media with the media acquisition system. Moreover, in an embodiment, the media acquisition system selects one or more media items for viewing by the organizer when the organizer shows interest in accessing media in which particular attendees feature.

The media acquisition system extracts the characteristics of the acquired media to analyze the media according to the preconfigured organizer preferences. For example, the media acquisition system extracts a time of capture of images, audio, and video in the media acquired from attendees of an event and organizes the media in a sequence of progression of the event, so that an organizer of the event may view the chronologically sequenced media on the graphical user interface rendered by the media acquisition system. If configured in the organizer preferences, the media acquisition system stitches together media to create a slideshow or a montage in chronological order of the time of capture of the media and creates collages of photos. In an example, the media acquisition system allows organizers of events to use the sequenced media resulting from the analysis performed by the media acquisition system to create documentaries, biographies, short films, etc. With approval from the organizer of the event, the media acquisition system shares the sequenced media with selected attendees or all attendees of the event, thereby incentivizing the attendees to share media with the organizer in future events. In an embodiment, an organizer of an event may announce an award for the best media shared with the media acquisition system through the event details received initially by the media acquisition system or through an edit to the generated online portal. In the embodiment, the media acquisition system displays the announcement in the generated online portal. After acquiring and analyzing media shared by the attendees, the media acquisition system ranks the analyzed media based on the characteristics of the media comprising, for example, resolution, clarity, lighting, composition, etc., and/or on any criteria provided by the organizer of the event via the preconfigured organizer preferences.

In another embodiment, the media acquisition system analyzes the acquired media to automatically create montages of media for sharing the results with the organizer of an event or the attendees of the event according to the organizer preferences. For example, the media acquisition system allows the organizer of the event to generate a video at the end of the event for displaying all approved media acquired from corresponding attendees in a video at the end of the event. In an exemplary scenario, at the end of a wedding event, the organizer may already have a video generated using the media acquisition system, thereby allowing the bride and the groom along with the attendees to watch all the messages or media items that were sent to the bride and the groom together. In an embodiment, the media acquisition system provides an easy-to-use video editor with transitions, effects, and features such as adding text over media, that the organizer may use to edit the analyzed media or the created montages of the media prior to sharing the analyzed media or the montages of the media. The organizer of the event accesses the video editor through the graphical user interface (GUI) rendered by the media acquisition system on an electronic device used by the organizer to access the media acquisition system. The media acquisition system allows the organizer to make edits to the media and the created montages, create a collage of media items, or otherwise organize the media and share the media via the GUI.

As part of the analysis of the acquired media, the media acquisition system selectively highlights particular aspects of the media to bring these aspects to the attention of the organizer of the event. The media acquisition system highlights media items that are blurry or of a file format that is uncommon as these media items may be incompatible with most electronic devices. As such, the media acquisition system assists the organizer in exploring the media for archiving, sharing, or using the media for marketing purposes. The media acquisition system determines duplicates among the media based on the characteristics of the media and highlights the duplicates for deletion of the duplicate media by the organizer or automatically handles the duplicates according to corresponding preconfigured organizer preferences. Such a scenario occurs if an attendee shares the same media more than once with the media acquisition system in error or shares multiple media items, which already contain duplicates, in one attempt as in the case of sharing a folder of media. If configured in the organizer preferences, the media acquisition system automatically deletes duplicate media items. Moreover, the media acquisition system exhibits the characteristics of the acquired media to the organizer of the event, thereby aiding in a decision-making process of the organizer with regard to the apt use of the analyzed media. The media acquisition system tags media with the characteristics of the acquired media and provides sorting and organizing functionality based on the tags in the graphical user interface rendered by the media acquisition system on an electronic device used by the organizer to access the media acquisition system.

The media acquisition system executes image recognition algorithms to identify objects, logos, people, precise locations, and other features in the media acquired from the attendees of an event. The media acquisition system applies face recognition to identify people and associates the identified people with information about the attendees of the event received from the event details provided by the organizer or from data received from the attendees of the event who shared media with the media acquisition system. The organizer of the event uses the information obtained via these algorithms for sharing details along with the analyzed media with social media, the attendees of the event, or elsewhere, or for marketing purposes as specified in terms and conditions that the organizer discloses to the attendees of the event via the media acquisition system. In an embodiment, in accordance with corresponding preconfigured organizer preferences, the media acquisition system automatically shares details or organizes media based on information gleaned from the image recognition of the acquired media.

The media acquisition system parses through the acquired media as part of the analysis to organize the media, identify duplicates, tag media items, highlight media items based on media quality and criteria defined in the preconfigured organizer preferences, and identify media with the same subjects via image recognition. If multiple media items from the same or different attendees feature the same subject, the media acquisition system composes the media items to generate dimensional models and augmented reality objects and renders the composed models and objects to the organizer of the event via the graphical user interface (GUI) displayed by the media acquisition system on the organizer's electronic device for use, editing, or further refinement through addition of other media items by the organizer. For example, if multiple attendees photograph an object on display at an event from various angles and share the photographs with the media acquisition system, the media acquisition system identifies the object in each photograph via image recognition, correlates the photograph with other photographs of the object, and generates composite three-dimensional (3D) models and augmented reality (AR) objects for the identified object as part of the analysis of the acquired media. The media acquisition system renders the generated three-dimensional models and the augmented reality objects to the organizer via the GUI displayed by the media acquisition system on the organizer's electronic device. The media acquisition system allows the organizer to edit the rendered models and objects, for example, by sharing additional photographs with the media acquisition system. The media acquisition system improves the three-dimensional models and the augmented reality objects with the additional data received from the organizer. The media acquisition system allows the organizer to share the three-dimensional models and the augmented reality objects with others.

In an embodiment, the media acquisition system notifies the attendees of the event who agreed to the acquisition of the media prior to the organizer sharing the media acquired from the attendees, to seek permission enabling the completion of the sharing of the media by the organizer. In another embodiment, the media acquisition system provides an agreement to the attendees of the event for their consent to the use of their media by the organizer prior to the acquisition of their media by the media acquisition system. The media acquisition system allows the organizer of the event to preselect the social media platforms to which the media acquisition system connects to enable sharing of the media on those social media platforms during the generation of the online portal through the GUI rendered by the media acquisition system on the electronic device of the organizer. Based on the preconfigured organizer preferences and permissions from attendees of the event who shared media with the media acquisition system, while sharing the media approved by the organizer on the social media platforms, the media acquisition system tags the media with information of the attendees who captured the media. Furthermore, the media acquisition system shares information gleaned from the media via the extracted characteristics of the media, thereby yielding insights about the shared media that were unknown to the attendees of the event who captured the shared media.

The media acquisition system, through the steps of the computer-implemented method disclosed herein, aggregates media from attendees of an event to provide access to the media thus acquired to the organizer of the event. The attendees of the event do not have to login to share a moment from the event; the attendees merely have to scan an optical label, for example, a quick response code (QR code®) or access a uniform resource locator (URL) of the generated online portal specific to the event directly, and record a video or upload and share videos and images from the event with the organizer of the event. In an embodiment, the media acquisition system requests the attendees of the event to agree to the terms of usage of the media acquisition system, which comprise, for example, sharing video footage or photos with the organizer of the event, and acquiescing to a media release for using footage and images they share on social media, websites, etc., optionally, for marketing purposes.

Insofar as availing the service of the media acquisition system by organizers of events, the media acquisition system allows partners to create and manage multiple event holder pages and generic online portals generated by the media acquisition system as templates for organizers to access and customize using the editing tools that the media acquisition system provides for the portrayal of event information prior to generating a final online portal configured for access by attendees of the event. The partners resell the service to multiple organizers of events. Partners comprise, for example, photographers, videographers, event planners, disc jockeys, masters of ceremonies, event venues, etc.

In an embodiment, the media acquisition system provides an optional media enhancement function for enhancing photos and videos uploaded by the attendees of the event on the fly during the acquisition of the media, thereby providing the attendees with options via the media request elements for utilizing the enhanced media for the upload, which the media acquisition system then acquires. The optional media enhancement function allows enhancements comprising, for example, image filtering, image enhancement, options of augmented reality such as adding virtual sunglasses or a hat to a subject in a video or an image, etc. In another embodiment, the media acquisition system allows partners, for example, videographers and photographers, to retain a copy of an original photo captured prior to the enhancement for inclusion, for example, in a final event video they produce from the video they captured from the event as well as from videos and photos acquired from the attendees of the event. In this embodiment, the media acquisition system provides an option for the partner and/or the organizer of the event to save both copies of each media file, the original and the enhanced or augmented versions if any. The media acquisition system allows merging of media acquired from the organizer of the event, the partners, and the attendees of the event. In an embodiment, the media acquisition system allows the organizer of the event to configure a setting for automating the merging of the media, for example, in the creation of slideshows or montages via the preconfigured organizer preferences. The media acquisition system allows the organizer of the event and the partners to use such automatically created media in making documentaries, short films, biographies, etc., pertaining to the event.

The media acquisition system allows the organizer of the event to review all the media including footage and photos acquired by the media acquisition system from the attendees of the event. In an embodiment, the media acquisition system provides an approval button on the graphical user interface (GUI) to allow the organizer to approve footage and photos to be automatically shared on social media platforms or websites that the organizer would like to link to the media acquisition system. The organizer manages such settings for the functions of the media acquisition system using the GUI rendered by the media acquisition system to the organizer. As such, the media acquisition system automates the acquisition of the media from the attendees of the event, the analysis of the acquired media, and the subsequent sharing of the analyzed media onto a repository of the organizer of the event after the generation of a shareable link to a generated online portal and subsequent distribution of the shareable link to the attendees of the event. When the attendees start uploading media to the media acquisition system, the media acquisition system allows the organizer to review the uploaded media and choose whether to approve the uploaded media to be shared to any linked social media platforms or websites. The media acquisition system allows the organizer to download all the uploaded media to a local storage on an electronic device of the organizer. If the event was created by a partner, the media acquisition system provides access of the uploaded media to both the organizer and the partner. In an embodiment where partners, for example, photographers and videographers, are involved, the media acquisition system allows the partners to collect the uploaded media in real time from the media acquisition system so that during and after the event, the partners may edit and display the collected media to attendees or the organizer of the event.

Disclosed below are different types of events for which organizers and partners employ the media acquisition system to provide access to media from attendees. An example of an event is a technology conference where an organizer of the technology conference employs the media acquisition system. In this example, the media acquisition system allows the organizer to create a webpage where attendees of the technology conference are allowed to upload media collected on their electronic devices as well as record footage from the event to be shared with the organizer using a flyer containing scannable quick response (QR) codes. Consider an example of a technology conference with new technologies on display. When attendees of the technology conference pick up their event badges, they also receive a scannable QR code® that directs the attendees to a webpage created by conference holders through the media acquisition system. The conference holders also provide flyers with the event QR code® and information at the event. The webpage loads on the attendees' electronic devices and requests the attendees to bookmark the webpage and use the webpage each time they see something exciting at the conference or want to share their experiences with the conference holders. As the attendees visit each booth and attend different sessions, they may capture photos, record videos, and upload the media from the event to the media acquisition system. Videos of people enjoying themselves and getting excited about all the new technology provide resources to the conference holders for use in future marketing. Also, during the event, the media acquisition system allows the conference holders to approve videos that will be automatically published on their website and social media live throughout the event, thereby creating excitement and having the attendees visit different booths and access the technology they see on the website throughout the course of the conference. In an embodiment, the conference holders may also request post-event feedback from attendees in the form of media. Consider for example, an attendee recording a video about how much the attendee enjoyed the event or uploading a video to the media acquisition system about one of the product demos they participated in and why the attendee liked the participating vendor's product.

Another scenario considers a use case for funerals and memorials. For events such as funerals and memorials, it would be a "pre-event" to gather video for the funeral or the memorial event itself. Prior to a funeral or a memorial, an event holder may send an email or provide a scannable quick response code (QR code®) in a publication or an obituary inviting people to visit an online portal generated by the media acquisition system for the funeral. In this example, the online portal comprises a message about the deceased and details of the funeral. During the days and weeks before the event, relatives and friends may share media comprising photos, videos, and audio clippings on the media acquisition system through the media request elements on the online portal accessed by them. The media acquisition system displays the shared media for review at the funeral to all attendees with prior permissions from the people sharing the media with the media acquisition system. Through the online portal, the media acquisition system provides an opportunity to people who cannot attend the event to share their thoughts about their lost loved one. The media acquisition system allows the media to be shared on a website or on social media so that people who could not attend the event may have the opportunity to see how the deceased was remembered and honored. The media acquisition system allows family members of the deceased to have memories of all the kind words and stories that were shared with them.

Yet another scenario involves a use case at a wedding. A bride and a groom may create an event page for their wedding using the media acquisition system and print out flyers with scannable quick response (QR) codes to leave on each table at a venue for the event. The flyer requests attendees of the wedding to share videos and photos from the event with the bride and the groom. During and/or after the event, the media acquisition system allows the bride and the groom, using their smartphones or other electronic devices, to view the footage that is being acquired by the media acquisition system and approve the videos and photos for their social media shared connections that they have already created when setting up the event page using the media acquisition system. The media acquisition system allows people who were unable to attend the event to view the approved videos and photos via the social media sharing platform selected by the bride and the groom to connect to the media acquisition system for approved media. After the event, the media acquisition system allows the bride and the groom to share the media with their videographer who can incorporate all the media files analyzed by the media acquisition system into a wedding video for the bride and the groom, where the attendees were able to contribute to the production of the final wedding video.

A partner such as an event planner may provide the services of the media acquisition system to organizers of events. A partner account on the media acquisition system allows creation and management of multiple event pages. The partner may also offer the services of the media acquisition system to their clients as an add-on to their regular event management services. An organizer of an event with access to the media acquisition system through a partner receives the benefit of all the features of an organizer that did not use a partner. An additional benefit of having a partner offer the services is that the partner can assist in registering with and providing event details to the media acquisition system, and editing the online portal generated by the media acquisition system. Partners typically also have another role at the event or are hired by the organizer in another capacity for the event.

Another use case scenario considers a partner, for example, a photographer who provides photography services at an event. The photographer who has been hired for the event may offer the organizer of the event the option of using the media acquisition system along with their services at an additional cost. After the event, the photographer may use the footage acquired and analyzed by the media acquisition system along with the footage created by the photographer using their own equipment. In another use case scenario, disco jockeys and masters of ceremonies who have been hired for an event may offer the organizer of the event the option of using the media acquisition system along with their services at an additional cost. For example, if the disco jockeys provide entertainment for an event, the disc jockeys can incorporate the media acquisition system into their performance encouraging attendees to record and upload media from the event for playing the media at the event itself. The list of people who can be partners in the use of the media acquisition system further comprises venue managers, caterers, event planners, wedding planners, stadium managers, theater managers, etc.

Figure 2:
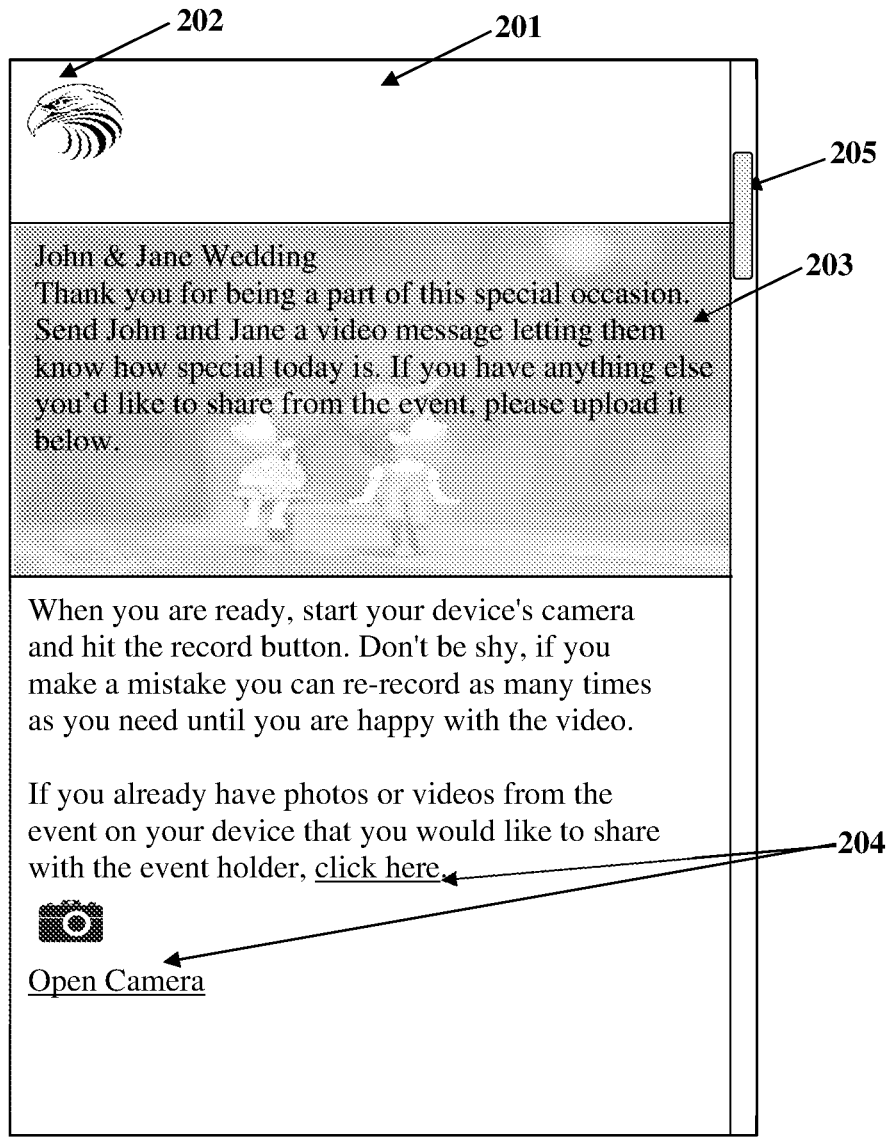
FIG. 2 exemplarily illustrates an online portal with media request elements generated by a media acquisition system for an event.

FIG. 2 exemplarily illustrates an online portal with media request elements 204 generated by the media acquisition system for an event. The online portal is, for example, a webpage 201 with a basic layout as exemplarily illustrated in FIG. 2, that portrays an image 203 and text along with media request elements 204. A scenario involving the use of the computer-implemented method and the media acquisition system disclosed herein is, for example, a wedding event for a bride and a groom. The top left of the webpage 201 displays a logo 202 of the organizer of the event. An image 203 with text superimposed conveys the context of the event and the online portal, that is, the wedding of the bride and the groom for whom hearty messages through media are solicited from attendees of the wedding. The media request elements 204 comprising text guiding the attendees of the event to view the online portal on their electronic devices in sharing media with the organizer further comprise clickable links that request access to memory storage units and cameras in the electronic devices. A scroll bar 205 allows scrolling through the webpage 201 to navigate the webpage 201.

Figure 3:
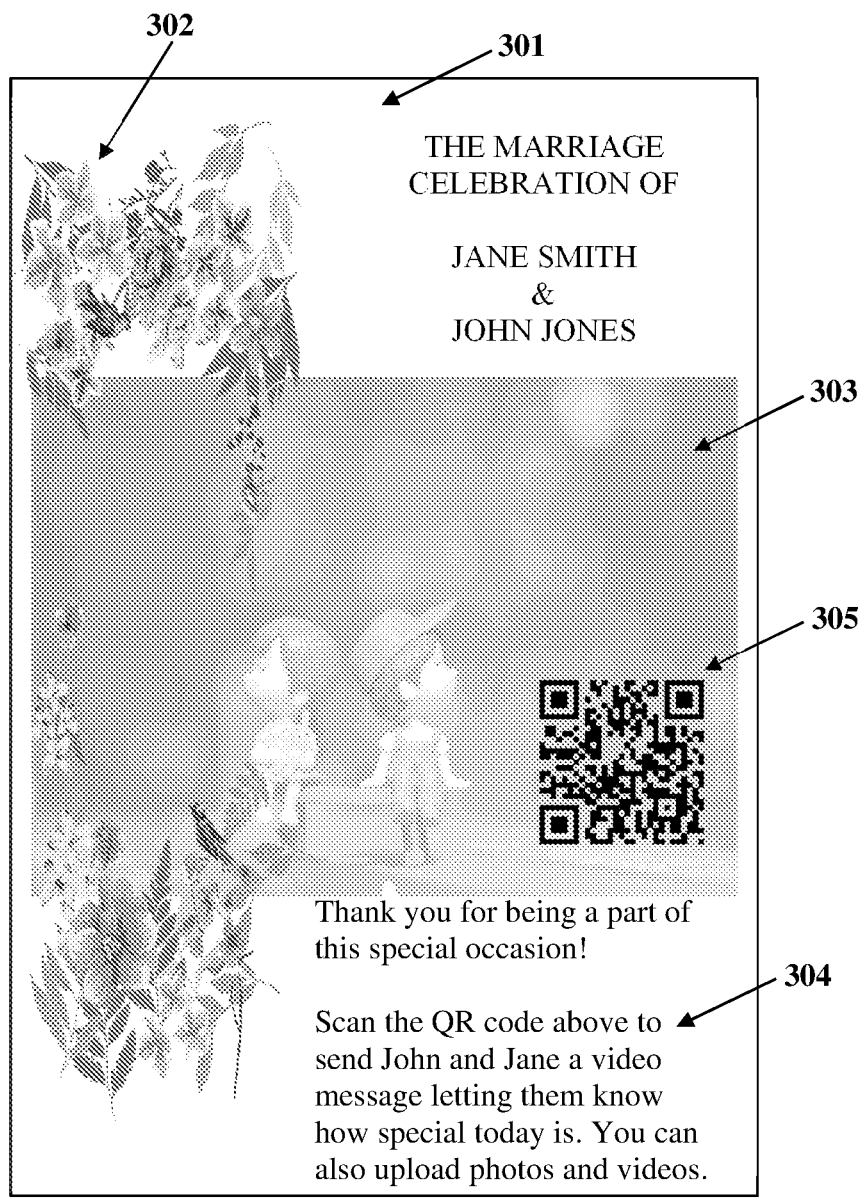
FIG. 3 exemplarily illustrates a flyer comprising a machine-readable optical code with a shareable link to an online portal generated by the media acquisition system and configured to be distributed to attendees of an event.

FIG. 3 exemplarily illustrates a flyer 301 comprising a machine-readable optical code 305 with a shareable link to an online portal generated by the media acquisition system and configured to be distributed to attendees of an event. The flyer 301 comprises a shareable link generated by the media acquisition system to provide attendees of the event access to the online portal exemplarily illustrated in FIG. 2. The flyer 301 comprises design elements 302, an image 303 that corresponds to the event, for example, the wedding of the bride and the groom, and associated text 304 bearing an appeal to the attendees to scan an inset optical label comprising the machine-readable optical code 305, for example, a quick response code (QR code®) or a barcode to be directed to the generated online portal exemplarily illustrated in FIG. 2. Copies of the generated flyer 301 are printed from the media acquisition system and distributed to the attendees of the wedding event, for example, through placement of the flyers 301 at tables reserved for the attendees at a banquet hall where the wedding ceremony is conducted. Therefore, for attendees at the wedding, through the flyer 301 at each table, the media acquisition system provides a scannable optical label with the QR code® or the barcode containing a message, for example, "Thank you for being part of this special occasion. Please scan the QR code with your phone's camera and send a video message for the bride and groom! You can also upload photos and videos you have already taken!"

Figure 4:
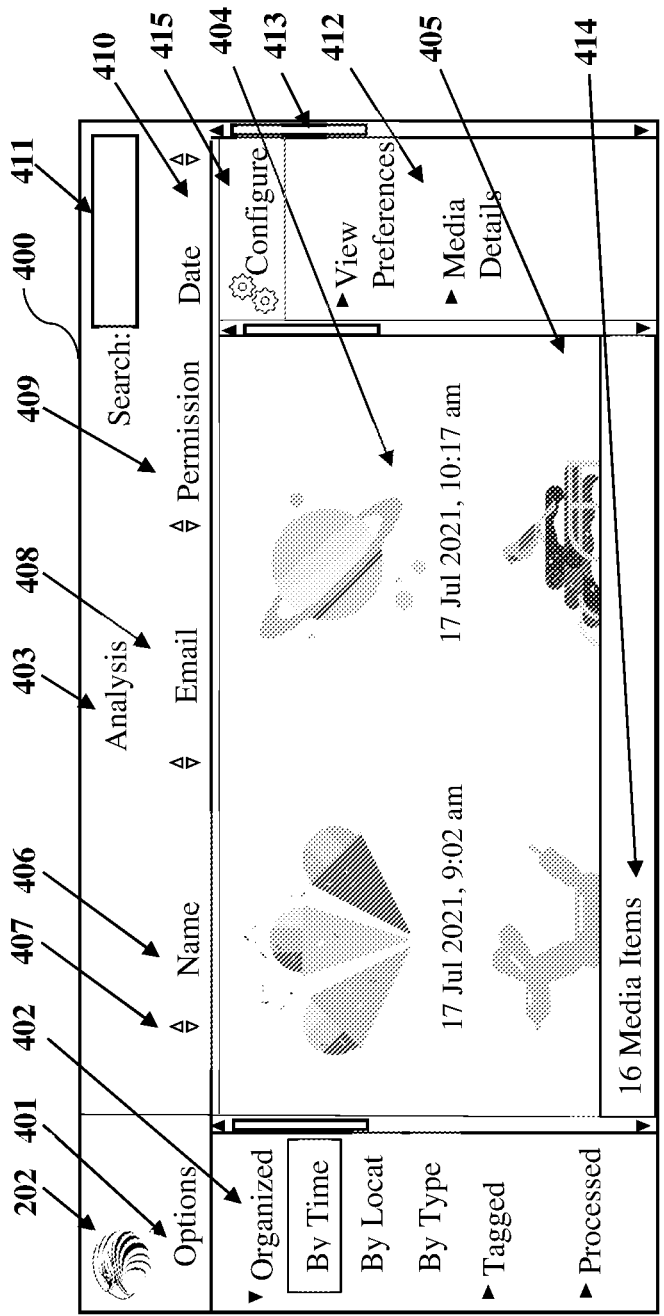
FIG. 4 exemplarily illustrates a graphical user interface that the media acquisition system renders on an electronic device of an organizer of an event for viewing and editing media organized in chronological order of acquisition of the media.

FIG. 4 exemplarily illustrates a graphical user interface (GUI) 400 that the media acquisition system renders on an electronic device of an organizer of an event for viewing and editing media organized in chronological order of acquisition of the media. The media acquisition system analyzes media acquired from electronic devices of attendees of the event and renders the results of the analysis to the organizer of the event via the GUI 400 for viewing, editing, and eventual sharing of the analyzed media as disclosed in the detailed description of FIG. 1. The media acquisition system renders the GUI 400 on an electronic device that the organizer uses for accessing the media acquisition system. The GUI 400 displays a logo 202 of the organizer of the event as disclosed in the detailed description of FIG. 2. The GUI 400 also displays an options sidebar 401 comprising the results of the analysis that the organizer can choose from to navigate through the analyzed media. The media acquisition system categorizes the results of the analysis, for example, as "organized", "tagged", and "processed", referring to organization of media, tagging of media, and processing of media, respectively. To navigate through the media in chronological order of acquisition of the media by the media acquisition system, the organizer selects a time organization result 402 of the analysis as indicated, for example, by a rectangular outline around the time organization result 402 as exemplarily illustrated in FIG. 4. The options sidebar 401 displays the time organization result 402 under an expanded menu of the "organized" category among the results of the analysis. Alternatively, the media acquisition system allows the organizer to view media organized by location or by type of media comprising, for example, images, audio, video, augmented reality objects, text, etc., on the GUI 400 by selecting corresponding results under the "organized" category.

The graphical user interface (GUI) 400 displays a window heading 403, for example, "analysis", referring to the results of the analysis of the acquired media that form the contents of the GUI 400. The GUI 400 displays chronologically organized media 404 with date and time stamps in the main window area 405 based on the corresponding selection in the options sidebar 401. The media acquisition system renders the chronologically organized media 404 through the analysis of the acquired media based on the characteristics of the acquired media in accordance with preconfigured organizer preferences as disclosed in the detailed description of FIG. 1. The chronologically organized media 404 comprises media acquired from the attendees of the event, the organizer of the event, and partners, if any. The media acquisition system allows the organizer of the event and the partners to view and use the chronologically organized media 404 displayed in the main window area 405 of the GUI 400 to create custom montages and slideshows to showcase the progression of the event. Aggregating media received from the attendees of the event in chronological order alongside media captured by the organizer and/or the partners allows for creation of documentaries, short films, biographies, etc., with ease. Based on preferences configured by the organizer and the partners, in an embodiment, the media acquisition system automatically merges some or all of the chronologically organized media 404 via context menu editing options (not shown) to generate montages, slideshows, etc., as disclosed in the detailed description of FIG. 1.

In an embodiment, the media acquisition system groups the chronologically organized media 404 by different characteristics of the media. The media acquisition system allows the organizer to select a name field 406 on the graphical user interface (GUI) 400 to group the chronologically organized media 404 by ascending or descending order of names of the attendees from whom the media acquisition system acquired media through consecutive selections of the name field 406. A triangle indicator 407 on the GUI 400 indicates whether the groups of the chronologically organized media 404 are sorted in ascending or descending order of the names of the attendees and cycles based on consecutive selections of the name field 406. Grouping via the name field 406 displays media acquired from each attendee in a chronological sequence of the acquisition in sections grouped according to the name of the attendees. Similarly, selecting an email field 408, a permission field 409, and a date field 410 on the GUI 400 groups the chronologically organized media 404 into sections based on email addresses of the attendees, permissions provided by the attendees for sharing of their media, and date of capture of the media, respectively. The date of capture of the media is relevant for events that span over many days.

The graphical user interface (GUI) 400 provides a search field 411 for the organizer of the event to search for specific media from among the chronologically organized media 404. The GUI 400 further comprises a settings sidebar 412 that allows the organizer to change view preferences, for example, for viewing the chronologically organized media 404 as small or large thumbnails, as a list of media files, a rotating gallery of media, etc. The settings sidebar 412 further comprises a media details section that displays the characteristics of the media selected in the main window area 405. The media acquisition system gleans the characteristics of the acquired media as disclosed in the detailed description of FIG. 1. The options sidebar 401, the main window area 405, and the settings sidebar 412, each have a scroll bar as exemplarily illustrated by the settings sidebar scroll bar 413. Furthermore, the GUI 400 comprises a status bar 414 that displays the number of items presented in the main window area 405 based on the selection of an option in the options sidebar 401. Furthermore, the GUI 400 comprises a configure button 415 that allows configuration of the GUI 400 by the organizer of the event. The media acquisition system allows the organizer to tweak elements of the GUI 400 by selecting the configure button 415, for example, to simplify the GUI 400 by removing the name field 406, the email field 408, the permission field 409, and the date field 410 from the GUI 400, or to further populate the GUI 400 by adding additional fields such as sharing status of the media, etc. Through the configure button 415, the media acquisition system allows the organizer to change the layout of various sections of the GUI 400 subject to restrictions set by the media acquisition system to prevent a malfunction of the GUI 400. The media acquisition system provides different ready-made templates of GUI layouts for the organizer to choose from via the configure button 415.

Figure 5:
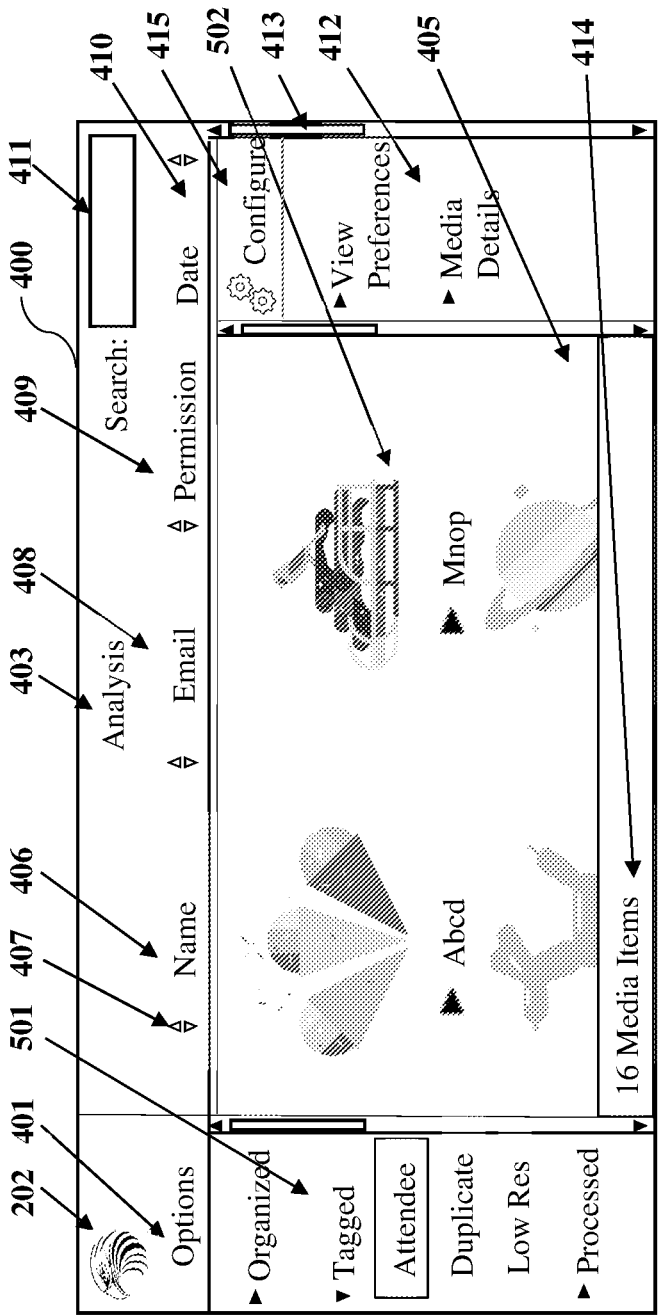
FIG. 5 exemplarily illustrates a graphical user interface that the media acquisition system renders on an electronic device of an organizer of an event for viewing and editing media tagged with details of a source of the media.

FIG. 5 exemplarily illustrates a graphical user interface (GUI) 400 that the media acquisition system renders on an electronic device of an organizer of an event for viewing and editing media tagged with details of a source of the media. The media acquisition system analyzes media acquired from electronic devices of attendees of the event agreeing to share the media and tags the acquired media based on the characteristics of the media as disclosed in the detailed description of FIG. 1. The media acquisition system renders the tagged media 502 on the GUI 400. As exemplarily illustrated in FIG. 5, the GUI 400 displays the logo 202 of the organizer of the event or a partner as disclosed in the detailed description of FIG. 2. The GUI 400 exemplarily illustrated in FIG. 5 also displays the options sidebar 401, the window heading 403, the main window area 405, the name field 406, the triangle indicator 407, the email field 408, the permission field 409, the date field 410, the search field 411, the settings sidebar 412, the settings sidebar scroll bar 413, the status bar 414, and the configure button 415 as disclosed in the detailed description of FIG. 4. The options sidebar 401 comprises an attendee tag result 501 that is selected by the organizer of the event as indicated, for example, by a rectangular outline around the attendee tag result 501. The options sidebar 401 displays the attendee tag result 501 under an expanded menu of the "tagged" category from among the results of the analysis as disclosed in the detailed description of FIG. 4. The organizer may also choose to view the analyzed media tagged as "duplicate" that indicates presence of duplicate copies of media or tagged as "low res" that indicates a low resolution of images or videos in the media by selecting the corresponding tag results under the "tagged" category.

The main window area 405 comprises attendee tagged media 502 corresponding to the selection of the attendee tag result 501 in the options sidebar 401. The attendee tagged media 502 comprises tags beneath each media item that indicate the name of the attendee from whom that media item was acquired by the media acquisition system. The media acquisition system allows the organizer to view details of the attendee directly in the tag by selecting the tag, which expands the tag and reveals the details of the attendee. The media acquisition system allows the organizer of the event and any partners who view the attendee tagged media 502 to use the attendee tagged media 502 to filter media by the attendees who captured them. For example, if in an event, there are very important persons (VIPs) or professional photographers or videographers who share media with the media acquisition system, the media acquisition system allows the organizer and the partners to select their media on the graphical user interface (GUI) 400 for sharing on social media or for marketing purposes. In some scenarios, the attendee tag result 501 assists in the identification of miscreants who have committed mischief or graver crimes, either through media shared by the miscreants themselves or through media shared by a prospective witness to such incidents who can be reached for assistance in serving justice. The media acquisition system allows the organizer to group the attendee tagged media 502, for example, by name of the attendee, email address of the attendee, permissions given, or by date of capture by selecting the name field 406, the email field 408, the permission field 409, or the date field 410 respectively. For example, while without grouping, the GUI 400 displays each item of the media with an attendee tag in an order corresponding to the type of media, grouping the attendee tagged media 502 by name of the attendee displays the attendee tagged media 502 in groups with an ascending or a descending alphabetical order of the names of the attendees corresponding to the attendee tagged media 502. The status bar 414 indicates the number of media items that are displayed in the main window area 405 with tags comprising attendee details.

Figure 6:
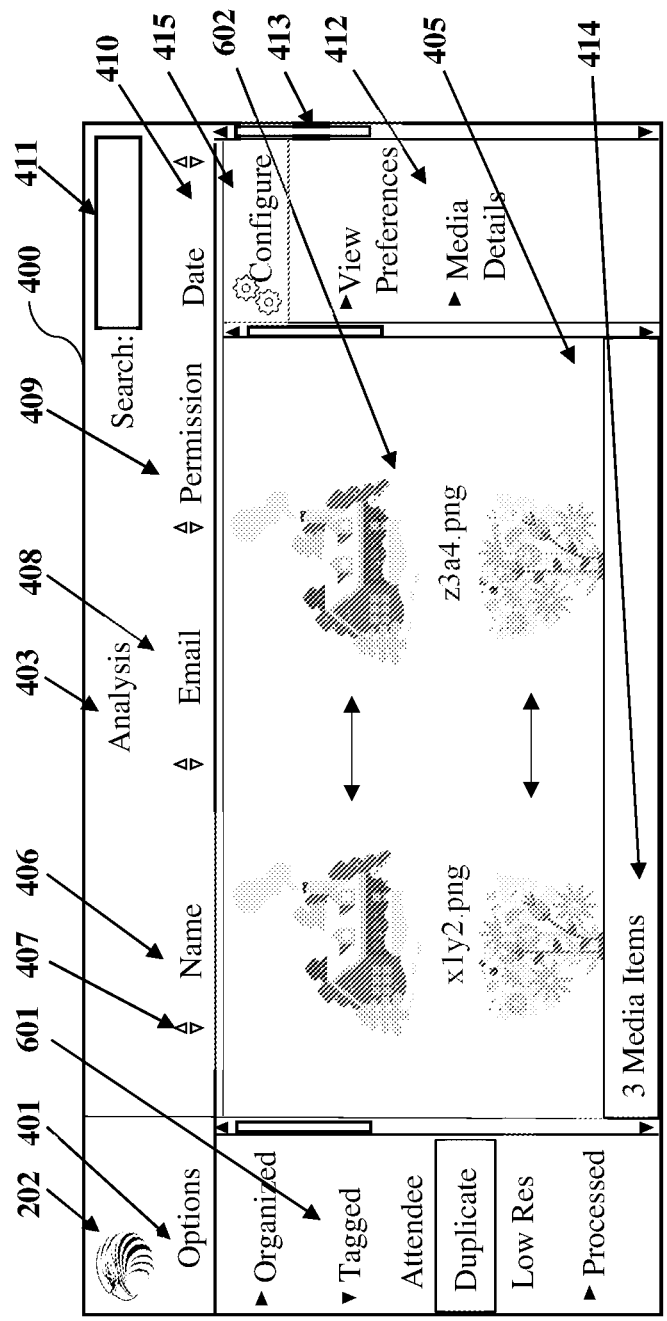
FIG. 6 exemplarily illustrates a graphical user interface that the media acquisition system renders on an electronic device of an organizer of an event for viewing and editing media tagged as having duplicate copies of the media.

FIG. 6 exemplarily illustrates a graphical user interface (GUI) 400 that the media acquisition system renders on an electronic device of an organizer of an event for viewing and editing media tagged as having duplicate copies of the media. The media acquisition system renders the GUI 400 to display results of the analysis of the media acquired from attendees of the event agreeing to share media, to the organizer of the event and tags the acquired media based on the characteristics of the media as disclosed in the detailed description of FIG. 1. As exemplarily illustrated in FIG. 6, the GUI 400 displays the logo 202 of the organizer of the event or a partner as disclosed in the detailed description of FIG. 2. The GUI 400 exemplarily illustrated in FIG. 6 also displays the options sidebar 401, the window heading 403, the main window area 405, the name field 406, the triangle indicator 407, the email field 408, the permission field 409, the date field 410, the search field 411, the settings sidebar 412, the settings sidebar scroll bar 413, the status bar 414, and the configure button 415 as disclosed in the detailed description of FIG. 4. The options sidebar 401 comprises a duplicate tag result 601 that is selected by the organizer of the event as indicated, for example, by a rectangular outline around the duplicate tag result 601. The options sidebar 401 displays the duplicate tag result 601 under an expanded menu of the "tagged" category from among the results of the analysis as disclosed in the detailed description of FIG. 4. The organizer may also choose to view the analyzed media tagged as "attendee" that indicates the source of media or tagged as "low res" that indicate a low resolution of images or videos in the media by selecting the corresponding tag results under the "tagged" category.

The main window area 405 comprises duplicate tagged media 602 corresponding to the selection of the duplicate tag result 601 in the options sidebar 401. The graphical user interface (GUI) 400 displays duplicate tagged media 602 in pairs or groups of the duplicates of media items with bidirectional arrows between the duplicate media items. The bidirectional arrows serve to convey the sameness of media in case the organizer chooses a view that does not show a preview of each media item and thus not providing visual confirmation of the media items being duplicates of each other. The media acquisition system allows the organizer to select a different view via the "view preferences" option in the settings sidebar 412 as disclosed in the detailed description of FIG. 4. The status bar 414 displays the number of media items that have duplicates as exemplarily illustrated in FIG. 6. Through the duplicate tag, the media acquisition system allows the organizer to handle duplicates that may arise when an attendee accidentally shares the same media multiple times or when a common media item obtained from the internet is shared by multiple attendees. The media acquisition system also allows automated merging of duplicate media items by selecting one media item among the duplicates with the highest resolution, earliest acquisition time, etc., based on preconfigured organizer preferences as disclosed in the detailed description of FIG. 1. The media acquisition system allows the organizer of the event to group the duplicate tagged media 602, for example, by name of the attendee, email address of the attendee, permissions given, or by date of capture by selecting the name field 406, the email field 408, the permission field 409, or the date field 410 respectively.

Figure 7:
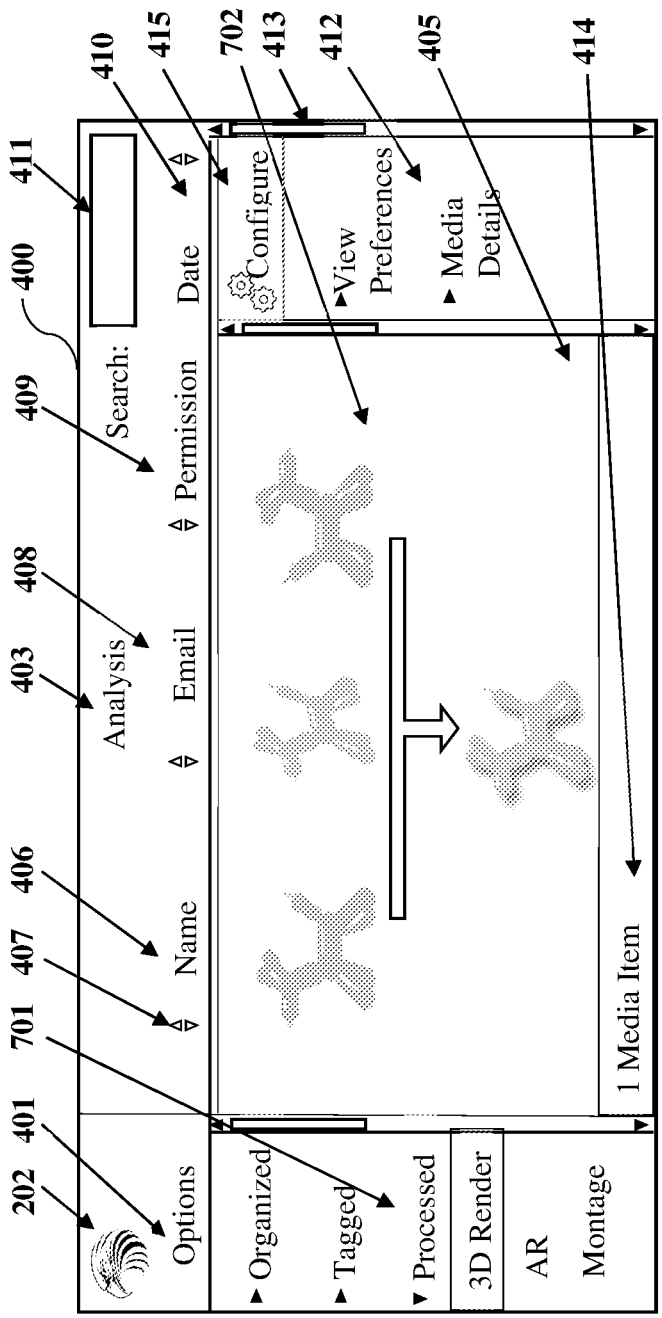
FIG. 7 exemplarily illustrates a graphical user interface that the media acquisition system renders on an electronic device of an organizer of an event for viewing and editing three-dimensional renditions of qualifying media.

FIG. 7 exemplarily illustrates a graphical user interface (GUI) 400 that the media acquisition system renders on an electronic device of an organizer of an event for viewing and editing three-dimensional (3D) renditions of qualifying media. The media acquisition system analyzes media acquired from electronic devices of attendees of the event agreeing to share the media and processes the acquired media based on the characteristics of the media according to preconfigured user preferences as disclosed in the detailed description of FIG. 1. The media acquisition system renders the processed media on the GUI 400 for the organizer to view, edit, or share. As exemplarily illustrated in FIG. 7, the GUI 400 displays the logo 202 of the organizer of the event or a partner as disclosed in the detailed description of FIG. 2. The GUI 400 exemplarily illustrated in FIG. 7 also displays the options sidebar 401, the window heading 403, the main window area 405, the name field 406, the triangle indicator 407, the email field 408, the permission field 409, the date field 410, the search field 411, the settings sidebar 412, the settings sidebar scroll bar 413, the status bar 414, and the configure button 415 as disclosed in the detailed description of FIG. 4. The options sidebar 401 comprises a 3D render result 701 that is selected by the organizer of the event as indicated, for example, by a rectangular outline around the 3D render result 701. The 3D render result 701 refers to 3D renditions of objects or persons from images in the acquired media. The media acquisition system collates acquired images of an object or a person from various angles. When a predetermined number of images from at least three angles are available for an object or a person, the media acquisition system renders a 3D image of the object or the person and displays the results of the rendition on the GUI 400.

The organizer may edit a three-dimensional (3D) rendition by removing some images, adding more images, or changing aspects, for example, shadows and color filters, smoothing of edges, etc., of the rendition that the media acquisition system provides to the organizer on selecting an edit option (not shown) from a context menu (not shown) for the rendition. Depending on the electronic device the organizer uses to access the media acquisition system, the media acquisition system receives input from different input devices, for example, a touchscreen, a computer mouse, a keyboard, a microphone for audio commands, etc., to edit the rendition of the 3D images. The options sidebar 401 displays the 3D render result 701 under an expanded menu of the "processed" category from among the results of the analysis as disclosed in the detailed description of FIG. 4. The organizer may also choose to view the analyzed media tagged as "AR" that indicates media processed to yield augmented reality objects that may be viewed on most electronic devices with display screens or tagged as "montage" that indicates montages the media acquisition system generates from the acquired media by selecting the corresponding results under the "processed" category.

The main window area 405 comprises three-dimensional (3D) rendition media 702 corresponding to the selection of the 3D render result 701 in the options sidebar 401. The 3D rendition media 702 comprises the images used for the rendition and the 3D rendition. The media acquisition system allows the organizer to group the images used for the 3D rendition in the 3D rendition media 702, for example, by name of the attendee, email address of the attendee, permissions given, or by date of capture by selecting the name field 406, the email field 408, the permission field 409, or the date field 410 respectively. As exemplarily illustrated in FIG. 7, the status bar 414 indicates that only one media item is displayed in the main window area 405 referring only to the 3D renditions in the 3D rendition media 702 as it is only the renditions that count for the 3D render result 701. The graphical user interface (GUI) 400 also displays the number of images used for each rendition and details of the rendition via the media details section in the settings sidebar 412 as disclosed in the detailed description of FIG. 4. The main window area 405 also comprises additional graphical elements such as a callout arrow that connects the images used in the 3D rendition to the rendition for convenient consumption of information by the organizer. The media acquisition system allows the organizer to change the layout of the GUI 400 or alter the graphical elements shown via the configure button 415 as disclosed in the detailed description of FIG. 4.

FIG. 8 exemplarily illustrates a graphical user interface (GUI) 800 that the media acquisition system renders on an electronic device of an organizer of an event for sharing media from the event. As disclosed in the detailed description of FIG. 1, the media acquisition system renders a GUI 800 on the electronic device of the organizer of the event through which the organizer accesses the media acquisition system. Through this GUI 800, the organizer organizes and shares media analyzed by the media acquisition system based on permissions received from attendees sharing the media during acquisition by the media acquisition system. The organizer reviews the analyzed media and approves media for sharing with selected attendees of the event, social media websites, and/or other third parties. In an embodiment as exemplarily illustrated in FIG. 8, the GUI 800 displays details arranged in a tabular format with column headings. The GUI 800 displays a window heading 403, as disclosed in the detailed description of FIG. 4, for example, "sharing", referring to the presentation of the analyzed media on the GUI 800 to allow the organizer to share the analyzed media. As exemplarily illustrated in FIG. 8, the GUI 800 indicates the first row selected by the organizer, for example, with double lines 801 bordering the first row. In another example, the GUI 800 indicates the selection of a row by shading the corresponding row with a color different from that of the other rows in the table. As exemplarily illustrated in FIG. 8, the first column 802 lists serial numbers for attendees from whom the media acquisition system acquired and analyzed media. An upward triangle 803 that is filled with color GUI 800 denotes sorting of the table in the order of increasing serial numbers. Selecting, for example, by clicking on or touching a touchscreen interface, any column heading on the GUI 800 sorts the table according to that column heading. For example, selecting the "full name" column heading or the "email" column heading on the GUI 800 sorts the table in an alphabetical order of the full names of the attendees or their email addresses respectively. Selecting the same column heading a second time in consecutive succession sorts the table in the reverse order of that column heading. For example, selecting the "full name" column heading a second time consecutively sorts the table according to the reverse alphabetical order of the full names of the attendees.

As exemplarily illustrated in FIG. 8, the second column 804 lists the names of the attendees corresponding to the assigned serial numbers. Selecting a "delete" option 805 below the full name of an attendee deletes the row from the table and associated media files with a pop-up confirmation dialog to confirm the action. The media acquisition system moves the deleted contents to a software-implemented recycle bin to allow for restoration of the contents by the organizer of the event, if necessary, at a later time. Selecting a "view files" option 806 below the full name of an attendee directs the organizer to another part (not shown) of the graphical user interface (GUI) 800 that displays media files acquired from that attendee's electronic device. The GUI 800 displays the "delete" option 805 and the "view files" option 806 for the selected rows of the table. For example, as the first row has been selected by the organizer as indicated by the double lines 801 in FIG. 8, the GUI 800 displays the "delete" option 805 and the "view files" option 806 only for the first row. Selecting another row displays the corresponding options on that row. As exemplarily illustrated in FIG. 8, the third column 807 displays email addresses of the corresponding attendees provided that the email addresses have been shared with the media acquisition system by those attendees during the acquisition of the media. If an attendee has not shared their email address, the corresponding entry in the column 807 remains empty. The email addresses displayed are configured as links which when selected by the organizer, direct the organizer to an email program on the electronic device accessing the media acquisition system for composing an email to the corresponding attendee. As exemplarily illustrated in FIG. 8, the fourth column 808 displays a status associated with media files acquired from an attendee and analyzed by the media acquisition system. The status reads as "pending review" if the organizer has yet to review all the media files of the corresponding attendee for approving the media files for sharing or not. If the organizer has reviewed all the media files, the status reads as either "approved" or "disapproved" according to the review. Selecting a "publish" option 809 directs the media acquisition system to automatically share approved media files of the corresponding attendee to any linked social media websites and other linked locations such as a cloud storage location. Since the first row has been selected by the organizer as indicated by the double lines 801, the GUI 800 displays the "publish" option 809 only in the first row. Selecting another row displays the corresponding option on that row.

As exemplarily illustrated in FIG. 8, the fifth column 810 displays, for example, an "on" or "off" status for a grant of permission by the corresponding attendee to share media acquired from that attendee during the acquisition of the media from that attendee by the media acquisition system. An "on" status indicates that permission has been granted by the attendee allowing the organizer of the event to share the associated media. An "off" status indicates to the organizer that the media acquisition system disallows sharing of the associated media proactively. In an embodiment, when the organizer convinces an attendee to allow sharing of the media at a later point in time, the media acquisition system allows the attendee to login to the media acquisition system provided that the attendee had shared information such as a social media handle at the time of sharing the media with the media acquisition system and later proves to be the owner of the social media handle by logging in to the media acquisition system via the social media handle. The media acquisition system connects to social media platforms for purposes of allowing access to the media acquisition system via a login through the social media platforms by attendees who have connected a profile on the social media platform with the media acquisition system while sharing media of the event. The media acquisition system allows an attendee who later changes their mind on granting permission to share media to re-upload such media by accessing the online portal a second time and choosing to allow sharing of the media the second time around. The media acquisition system requires the attendees to still possess the media on their electronic devices for granting permission to share the media the second time around.

In all cases, the media acquisition system ensures security of personal information and media and is resistant to attempts at gaming the media acquisition system. The media acquisition system enforces security by verifying credentials of every person accessing the media acquisition system through secondary sources such as social media platforms or by prior authentication with that instance of the media acquisition system as is the case with a login of the organizer of the event. The media acquisition system requests each user who accesses the media acquisition system to agree to terms of use comprising sharing of media and collection of information with corresponding permissions from each user. In an embodiment, the media acquisition system captures details such as the internet protocol (IP) address and additional information about an electronic device used to interact with the media acquisition system. For example, if there is an incident where an attendee of an event raises an objection regarding shared media that they had not approved for sharing, the details captured by the media acquisition system reveal the electronic device from which the concerned media was shared in addition to the time and date of the acquisition and related permissions provided through the electronic device.

As exemplarily illustrated in FIG. 8, the sixth column 811 displays the date and the time of acquisition of the media from a corresponding attendee. The graphical user interface (GUI) 800 comprises a search box 411, as disclosed in the detailed description of FIG. 4, that allows the organizer of the event to search for media acquired and analyzed by the media acquisition system through attributes of the media such as filenames and metadata, for example, file size, date and time of acquisition, type of media, etc. Moreover, the GUI 800 comprises a scroll bar 413, as disclosed in the detailed description of FIG. 4, to scroll through the table thereby allowing display of the GUI 800 on screens of various aspect ratios and sizes. The media acquisition system identifies the electronic device accessing the media acquisition system to determine the size and resolution of a display screen of the electronic device and to determine whether the electronic device is, for example, a mobile device, a laptop, a desktop, any computer connected to a standalone display screen, or a projector to intelligently determine display conditions for the most suitable rendition of the GUI 800. Furthermore, the GUI 800 comprises a status bar 414, as disclosed in the detailed description of FIG. 4, that displays information such as the number of entries in the table, the number of rows of the table selected if any, file attributes such as file size, image resolution, etc., of a selected file, etc.

Figure 9:
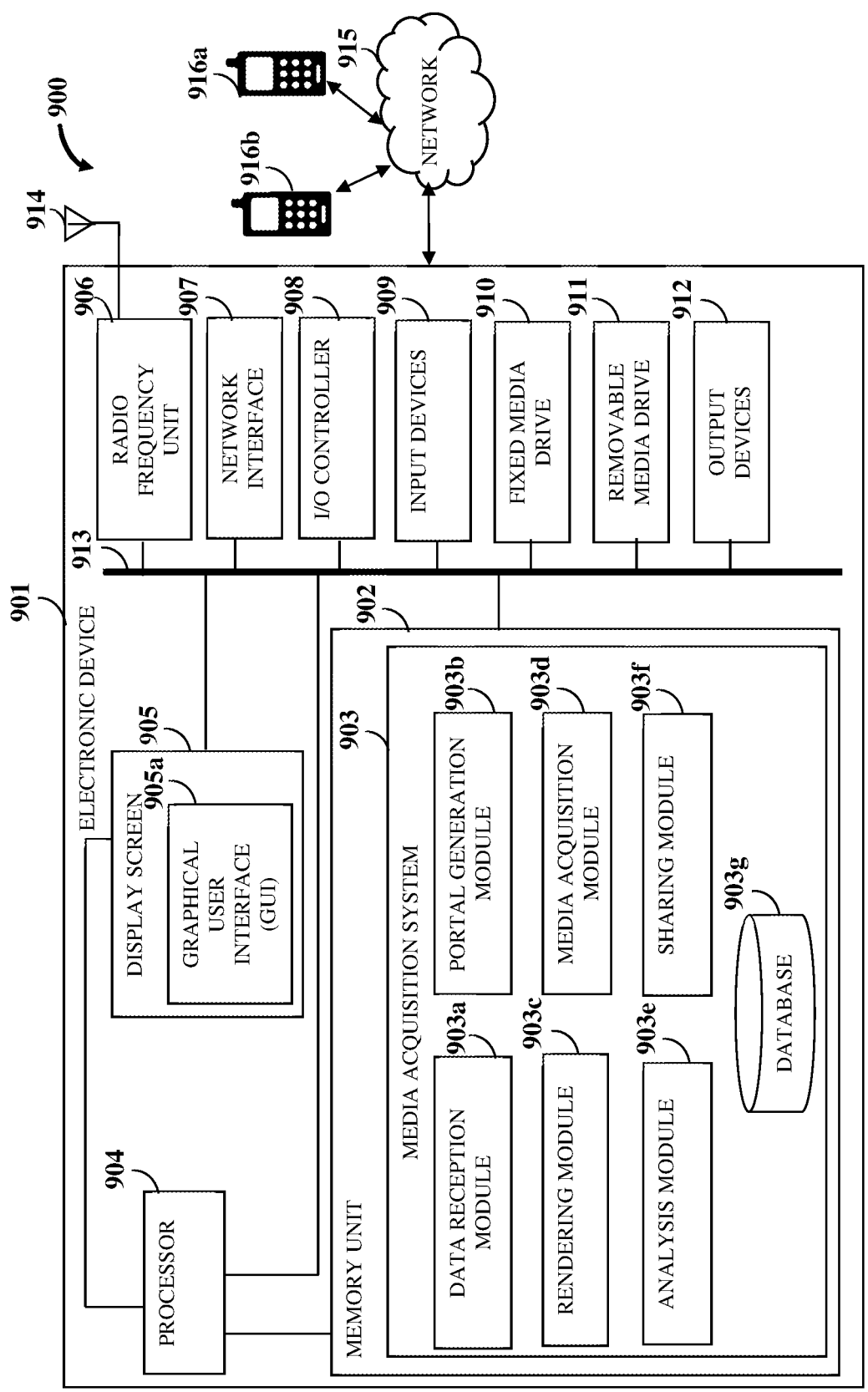
FIG. 9 illustrates an architectural block diagram of an exemplary implementation of a system for accessing media from attendees of an event.

FIG. 9 exemplarily illustrates an architectural block diagram of an exemplary implementation of a system 900 for accessing media from attendees of an event. The system 900 disclosed herein comprises the media acquisition system 903. The media acquisition system 903 is implemented on an electronic device 901, for example, a personal computer, a tablet computing device, a mobile computer, a portable computing device, a laptop, a touch device, a workstation, a server, a portable electronic device, a network enabled computing device, an interactive network enabled communication device, any other suitable computing equipment, combinations of multiple pieces of computing equipment, etc. In an embodiment, the computing equipment is used to implement applications such as media playback applications, a web browser, an electronic mail (email) application, a calendar application, etc., with one or more servers associated with one or more online services.

The media acquisition system 903 communicates with electronic devices 916a and 916b of the attendees of the event via a network 915, for example, a short-range network or a long-range network. The network 915 is, for example, the Internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In various embodiments, the network 915 is a wired network, or a wireless network, or a combination of networks using different protocols. In an embodiment, the media acquisition system 903 is accessible to users, for example, organizers, partners, and attendees of the event through a broad spectrum of technologies and devices such as cellular phones, tablet computing devices, etc., with access to the network 915.

As exemplarily illustrated in FIG. 9, the system 900 comprises a non-transitory, computer-readable storage medium, for example, a memory unit 902 for storing programs and data, and at least one processor 904 communicatively coupled to the non-transitory, computer-readable storage medium. As used herein, "non-transitory computer-readable storage medium" refers to all computer-readable media that contain and store computer programs and data, except for a transitory, propagating signal. Examples of the computer-readable media comprise hard drives, solid state drives, optical discs or magnetic disks, memory chips, a read-only memory (ROM), a register memory, a processor cache, a random-access memory (RAM), etc. The non-transitory, computer-readable storage medium stores computer program instructions defined by modules, for example, 903a, 903b, 903c, 903d, 903e, 903f, etc., of the media acquisition system 903. The media acquisition system 903 is installed and stored in the memory unit 902 of the electronic device 901. The memory unit 902 is used for storing program instructions, applications, and data. The memory unit 902 is, for example, a random access memory (RAM) or another type of dynamic storage device that stores information and instructions for execution by the processor 904. The memory unit 902 also stores temporary variables and other intermediate information used during execution of the instructions by the processor 904. The electronic device 901 further comprises a read only memory (ROM) or another type of static storage device that stores static information and instructions for the processor 904.

The processor 904 executes the computer program instructions defined by the modules, for example, 903*a*, 903*b*, 903*c*, 903*d*, 903*e*, 903*f*, etc., of the media acquisition system 903. The processor 904 refers to any of one or more microprocessors, central processing unit (CPU) devices, finite state machines, computers, microcontrollers, digital signal processors, logic, a logic device, a user circuit, an application specific integrated circuit (ASIC), a field-programmable gate array (FPGA), a chip, etc., or any combination thereof, capable of executing computer programs or a series of commands, instructions, or state transitions. In an embodiment, the processor 904 is implemented as a processor set comprising, for example, a programmed microprocessor and a math or graphics co-processor. The processor 904 is selected, for example, from the Intel® processors such as the Itanium® microprocessor or the Pentium® processors, Advanced Micro Devices (AMD®) processors such as the Athlon® processor, UltraSPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The media acquisition system 903 disclosed herein is not limited to employing a processor 904. In an embodiment, the media acquisition system 903 employs a controller or a microcontroller.

As exemplarily illustrated in FIG. 9, the system 900 further comprises a display screen 905, on which, a graphical user interface (GUI) 905*a* is displayed for interaction with a user such as an organizer of the event via the electronic device 901, a radio frequency (RF) unit 906, a network interface 907, an input/output (I/O) controller 908, input devices 909, a fixed media drive 910 such as a hard drive, a removable media drive 911 for receiving removable media, output devices 912, a data bus 913, and an antenna 914. The data bus 913 permits communications between the modules, for example, 902, 904, 905, 906, 907, 908, 909, 910, 911, and 912 of the media acquisition system 903. The RF unit 906 allows transmission and/or reception of radio signals between the electronic devices 901, 916*a*, and 916*b* via the antenna 914. The display screen 905 comprises, for example, a video display, a liquid crystal display, a plasma display, an organic light emitting diode (OLED) based display, etc. The GUI 905*a* is, for example, an online web interface, a web based downloadable application interface, a mobile based downloadable application interface, etc.

The network interface 907 enables connection of the media acquisition system 903 in the electronic device 901 to the network 915. In an embodiment, the network interface 907 is provided as an interface card also referred to as a line card. The network interface 907 comprises, for example, of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on a transmission control protocol (TCP)/internet protocol (IP), interfaces based on wireless communications technology such as satellite technology, RF technology, near field communication (NFC), etc. The I/O controller 908 controls input actions and output actions performed by the media acquisition system 903.

The input devices 909 are used for inputting data into the media acquisition system 903. An organizer of an event uses the input devices 909 to input data into the media acquisition system 903. The organizer of the event inputs registration and event details using the input devices 909 and on generation of the online portal, uses the input devices 909 to operate the editing tools on the generated online portal to portray the event information based on his or her preferences as disclosed in the detailed description of FIG. 1. The input devices 909 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

In an embodiment as exemplarily illustrated in FIG. 9, the media acquisition system 903 comprises a data reception module 903*a*, a portal generation module 903*b*, a rendering module 903*c*, a media acquisition module 903*d*, an analysis module 903*e*, a sharing module 903*f*, and one or more databases 903*g* stored in the memory unit 902. The database (s) 903*g* of the media acquisition system 903 is any storage area or medium used for storing data and files. In an embodiment, the database(s) 903*g* is, for example, any of a structured query language (SQL) data store or a not only SQL (NoSQL) data store such as the Microsoft® SQL Server®, the Oracle® servers, the MySQL® database of MySQL AB Limited Company, the mongoDB® of MongoDB, Inc., the Neo4j graph database of Neo Technology Corporation, the Cassandra database of the Apache Software Foundation, the HBase® database of the Apache Software Foundation, etc. In another embodiment, the database(s) 903*g* is a location on a file system. In another embodiment, the database(s) 903*g* is remotely accessible by the media acquisition system 903 via the network 915. In another embodiment, the database(s) 903*g* is configured as a cloud-based database implemented in a cloud computing environment, where computing resources are delivered as a service over the network 915. As used herein, "cloud computing environment" refers to a processing environment comprising configurable, computing, physical and logical resources, for example, networks, servers, storage media, virtual machines, applications, services, etc., and data distributed over the network 915. The cloud computing environment provides on-demand network access to a shared pool of the configurable, computing, physical and logical resources. In an embodiment, the media acquisition system 903 is a cloud computing-based platform implemented as a service for accessing media from attendees of an event. In various embodiments, the media acquisition system 903 is developed, for example, using the Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc.

The data reception module 903a receives registration and event details from the organizer of the event. The portal generation module 903b generates an online portal specific to the event and the organizer based on the received registration and event details with media request elements. The online portal is accessible over the network 915. The portal generation module 903b further generates a shareable link to the generated online portal in multiple formats for rendering the generated shareable link to the attendees of the event. The rendering module 903c displays the generated online portal on electronic devices 916a and 916b of the attendees of the event that access the generated online portal through the generated shareable link in one of the formats. The media acquisition module 903d acquires media from the electronic devices 916a and 916b of the attendees of the event agreeing to share the media with the organizer via the media request elements on the displayed online portal through a live capture of the media or an access of stored media with an optional media enhancement. The media acquisition module 903d also allows multiple attempts by the attendees at the live capture and the choice of stored media before acquiring the media from the electronic devices 916a and 916b. The analysis module 903e analyzes the acquired media based on characteristics of the acquired media in accordance with preconfigured organizer preferences. The preconfigured organizer preferences are part of the event details received by the data reception module 903a. The characteristics of the acquired media and the preconfigured organizer preferences are disclosed in the detailed description of FIG. 1. The analysis of the acquired media by the analysis module 903e comprises organizing, enhancing, selectively highlighting, tagging, and applying image recognition to the acquired media; creating montages, three-dimensional models, and augmented reality objects from the acquired media; and exhibiting the characteristics of the acquired media. The media acquisition system 903 implements artificial intelligence and machine learning algorithms including face recognition algorithms to obtain characteristics of the acquired media and provide services in accordance with the preconfigured organizer preferences. The sharing module 903f shares a selection of the analyzed media on preselected social media platforms on receiving a corresponding request from the organizer of the event.

Computer applications and programs are used for operating the media acquisition system 903. The programs are loaded onto the fixed media drive 910 and into the memory unit 902 of the electronic device 901 via the removable media drive 911. In an embodiment, the computer applications and programs are loaded directly on the electronic device 901 via the network 915. The output devices 912 output the results of operations performed by the media acquisition system 903. For example, the media acquisition system 903 renders the display of the generated online portal on the electronic devices 916a and 916b of the attendees of the event that access the online portal and renders the GUI 905a for the organizer of the event to interact with the media acquisition system 903, using the output devices 912.

The processor 904 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., the Android® operating system of Google Inc., the Windows Phone® operating system of Microsoft Corporation, the BlackBerry® operating system of BlackBerry Limited, the iOS operating system of Apple Inc., the Symbian™ operating system of Symbian Foundation Limited, etc. The media acquisition system 903 employs the operating system for performing multiple tasks. The operating system is responsible for management and coordination of activities and sharing of resources of the media acquisition system 903. The operating system further manages security of the media acquisition system 903, peripheral devices connected to the media acquisition system 903, and network connections. The operating system employed on the media acquisition system 903 recognizes, for example, inputs provided by a user of the media acquisition system 903 such as the organizer of the event, using one of the input devices 909, the output devices 912, files, and directories stored locally on the fixed media drive 910. The operating system on the media acquisition system 903 executes different programs using the processor 904. The processor 904 and the operating system together define a computer platform for which application programs in high level programming languages are written. The operating system of the electronic device 901 determines the programming languages used in the media acquisition system 903. For example, the Java® programming language is used for developing the media acquisition system 903 on the electronic device 901 with an Android® operating system, while Objective-C® of Apple Inc., is used for developing the media acquisition system 903 on the electronic device 901 with the iOS operating system, and the UNITY® libraries and platforms of Unity IPR ApS, LLC., are used developing the media acquisition system 903 for both the Android® operating system and the iOS operating system.

The processor 904 retrieves instructions defined by the data reception module 903a, the portal generation module 903b, the rendering module 903c, the media acquisition module 903d, the analysis module 903e, and the sharing module 903f stored in the memory unit 902, for performing respective functions disclosed above. The processor 904 retrieves the instructions for executing the modules, for example, 903a, 903b, 903c, 903d, 903e, 903f, etc., of the media acquisition system 903 from the memory unit 902. A program counter determines the location of the instructions in the memory unit 902. The program counter stores a number that identifies the current position in a program of each of the modules, for example, 903a, 903b, 903c, 903d, 903e, 903f, etc., of the media acquisition system 903. The instructions fetched by the processor 904 from the memory unit 902 after being processed are decoded. The instructions are stored in an instruction register in the processor 904. After processing and decoding, the processor 904 executes the instructions, thereby performing processes defined by those instructions.

At the time of execution, the instructions stored in the instruction register are examined to determine the operations to be performed. The processor 904 then performs the specified operations. The operations comprise arithmetic operations and logic operations. The operating system performs multiple routines for performing a number of tasks required to assign the input devices 909, the output devices 912, and the memory unit 902 for execution of the modules, for example, 903a, 903b, 903c, 903d, 903e, 903f, etc., of the media acquisition system 903. The tasks performed by the operating system comprise, for example, assigning memory to the modules, for example, 903a, 903b, 903c, 903d, 903e, 903f, etc., of the media acquisition system 903, and to data used by the media acquisition system 903, moving data between the memory unit 902 and disk units, and handling input/output operations. The operating system performs the tasks on request by the operations, and after performing the tasks, the operating system transfers the execution control back to the processor 904. The processor 904 continues the execution to obtain outputs. The outputs of the execution of the modules, for example, 903*a*, 903*b*, 903*c*, 903*d*, 903*e*, 903*f*, etc., of the media acquisition system 903 are displayed to the organizer of the event accessing the media acquisition system 903 on the output device 912.

The non-transitory, computer-readable storage medium disclosed herein stores computer program codes comprising instructions executable by at least one processor 904 for accessing media from attendees of an event. The computer program codes comprise a first computer program code for receiving registration and event details from an organizer of the event; a second computer program code for generating an online portal specific to the event and the organizer based on the received registration and event details with media request elements, where the online portal is accessible over the network 915; a third computer program code for generating a shareable link to the generated online portal in multiple formats for rendering the generated shareable link to the attendees of the event; a fourth computer program code for displaying the generated online portal on the electronic devices 916*a* and 916*b* of the attendees of the event that access the generated online portal through the generated shareable link in one of the formats; a fifth computer program code for acquiring media from the electronic devices 916*a* and 916*b* of the attendees of the event agreeing to share the media with the organizer via the media request elements on the displayed online portal through a live capture of the media or an access of stored media with an optional media enhancement; a sixth computer program code for analyzing the acquired media based on characteristics of the acquired media in accordance with preconfigured organizer preferences, where the preconfigured organizer preferences are part of the received event details; and a seventh computer program code for sharing a selection of the analyzed media on preselected social media platforms on receiving a corresponding request from the organizer of the event.

The non-transitory, computer-readable storage medium disclosed herein further stores additional computer program codes for performing additional steps that may be required and contemplated for accessing media from attendees of an event. In an embodiment, a single piece of computer program code comprising computer executable instructions performs one or more steps of the computer-implemented method disclosed herein for accessing media from attendees of an event. The computer program codes comprising computer executable instructions are embodied on the non-transitory, computer-readable storage medium. The processor 904 of the system 900 retrieves these computer executable instructions and executes them. When the computer executable instructions are executed by the processor 904, the computer executable instructions cause the processor 904 to perform the steps of the computer-implemented method for accessing media from attendees of an event.

In the computer-implemented method disclosed herein, the design and flow of interactions between the media acquisition system 903 with the rest of the system 900 and with the electronic devices 916*a* and 916*b* of the attendees of the event via the network 915 is deliberate, designed, and directed. The interactions designed by the media acquisition system 903 allow the media acquisition system 903 to obtain user input from an organizer of an event and media from the attendees of the event. From this information, through the use of another separate and autonomous computer program, the media acquisition system 903 transforms the collected data to generate an online portal. Through the use of yet another separate and autonomous computer program, the media acquisition system 903 aggregates media received from the attendees of the event for providing access to the acquired media to an organizer of the event. The media acquisition system 903 executes a separate and autonomous computer program defined by artificial intelligence and machine learning algorithms to analyze and transform the acquired media according to preconfigured organizer preferences and subsequently shares a selection of the analyzed media on preselected social media platforms. To generate an online portal with edits from the organizer of the event, generate a shareable link in multiple formats with design elements for rendering the shareable link to the attendees of the event, acquire media from the electronic devices 916*a* and 916*b* of the attendees, analyze the acquired media to transform the same and create montages, and automatically share the analyzed media to a repository of the organizer of the event requires more than five (5) separate computer programs, the execution of which cannot be easily or manually executed by a person working with a generic computer. A generic computer using a generic program cannot generate a customized online portal and shareable links, access media from the electronic devices 916*a* and 916*b* of the attendees of the event, analyze and transform the media, and provide for quick sharing of selected media on multiple social media platforms in accordance with the method steps disclosed above.

It is readily apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refers to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing or encoding a set of instructions for execution by a computer, a processor, or a similar device and that causes a computer, a processor, or a similar device to perform any one or more of the methods disclosed herein.

In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft®.NET, Objective-C®, etc. Other object-oriented, functional, scripting, and/or logical programming languages can also be used. In an embodiment, the computer program codes or software programs are stored on or in one or more mediums as object code. In another embodiment, various aspects of the method and the system disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the method and the system disclosed herein are implemented as programmed elements, or non-programmed elements, or any suitable combination thereof.

Where databases are described such as the database 903g, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats comprising relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the system, the databases are integrated to communicate with each other for enabling simultaneous updates of data linked across the databases, when there are any updates to the data in one of the databases.

The method and the system disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The method and the system disclosed herein are not limited to a particular computer system platform, processor, operating system, or network. In an embodiment, one or more aspects of the method and the system disclosed herein are distributed among one or more computer systems, for example, servers configured to provide one or more services to one or more client computers, or to perform a complete task in a distributed system. For example, one or more aspects of the method and the system disclosed herein are performed on a client-server system that comprises components distributed among one or more server systems that perform multiple functions according to various embodiments. These components comprise, for example, executable, intermediate, or interpreted code, which communicate over a network using a communication protocol. The method and the system disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the method and the system disclosed herein. While the method and the system have been described with reference to various embodiments, it is understood that the words, which have been used herein, are words of description and illustration, rather than words of limitation. Further, although the method and the system have been described herein with reference to particular means, materials, techniques, and embodiments, the method and the system are not intended to be limited to the particulars disclosed herein; rather, the method and the system extend to all functionally equivalent structures, methods and uses, such as are within the scope of the appended claims. While multiple embodiments are disclosed, it will be understood by those skilled in the art, having the benefit of the teachings of this specification, that the method and the system disclosed herein are capable of modifications and other embodiments may be effected and changes may be made thereto, without departing from the scope and spirit of the method and the system disclosed herein.

I claim:

1. A computer-implemented method for accessing media from attendees of an event, the method employing a media acquisition system executable by at least one processor configured to execute computer program instructions for performing the method, the method comprising:
   receiving registration and event details from an organizer of the event by the media acquisition system;
   generating a shareable link to an online portal by the media acquisition system, wherein the online portal is accessible on one or more electronic devices of the attendees of the event through the generated shareable link;
   acquiring media from the electronic devices of the attendees of the event agreeing to share the media with the organizer, by the media acquisition system;
   analyzing the acquired media based on characteristics of the acquired media in accordance with preconfigured organizer preferences, wherein the preconfigured organizer preferences are part of the received event details;
   receiving an approval from the organizer for a selection of the analyzed media, wherein the organizer reviews the selection of the analyzed media prior to approving the selection of the analyzed media; and
   automatically sharing the selection of the approved media on preselected social media platform and/or website by the media acquisition system.

2. The computer-implemented method of claim 1, wherein the analysis of the acquired media comprises organizing, enhancing, selectively highlighting, tagging, and applying image recognition to the acquired media; creating montages, three-dimensional models, and augmented reality objects from the acquired media; and exhibiting the characteristics of the acquired media.

3. The computer-implemented method of claim 1, wherein receiving the registration and event details from the organizer of the event further comprises generating the online portal specific to the event and the organizer based on the received registration and event details with media request elements by the media acquisition system, wherein the online portal is accessible over a network.

4. The computer-implemented method of claim 1, wherein the shareable link to the online portal is generated in a plurality of formats by the media acquisition system for rendering the generated shareable link to the attendees of the event.

5. The computer-implemented method of claim 1 further comprises displaying the generated online portal on electronic devices of the attendees of the event that access the generated online portal through the generated shareable link in one of a plurality of formats, by the media acquisition system.

6. The computer-implemented method claim 5, wherein the media is acquired from the electronic devices of the agreeing attendees via media request elements on the displayed online portal through one of a live capture of the media and an access of stored media with an optional media enhancement, by the media acquisition system.

7. The computer-implemented method of claim 1, further comprises one or more of:
acquiring post-event feedback from the attendees; and
acquiring pre-event feedback from the attendees.

8. The computer-implemented method of claim 1, wherein generating the shareable link to the online portal by the media acquisition system comprises generating a machine-readable optical code comprising the shareable link, wherein the machine-readable optical code comprises one of a quick response code and a barcode.

9. A system for accessing media from attendees of an event, the system comprising:
a non-transitory, computer-readable storage medium configured to store computer program instructions and data defined by a media acquisition system;
at least one processor communicatively coupled to the non-transitory, computer-readable storage medium, the at least one processor configured to execute the defined computer program instructions; and
the media acquisition system executable by the at least one processor for performing a method comprising:
receiving registration and event details from an organizer of the event
generating a shareable link to an online portal, wherein the online portal is configured to be accessible on one or more electronic devices of the attendees of the event through the generated shareable link;
acquiring media from the electronic devices of the attendees of the event agreeing to share the media with the organizer;
analyzing the acquired media based on characteristics of the acquired media in accordance with preconfigured organizer preferences, wherein the preconfigured organizer preferences are part of the event details received by the media acquisition system;
receiving an approval from the organizer liar a selection of the analyzed media, wherein the organizer reviews the selection of the analyzed media prior to approving the selection of the analyzed media; and
automatically sharing the selection of the approved media on preselected social media platforms and/or websites.

10. The system of claim 9, wherein receiving registration and event details from an organizer of the event further comprises generating the online portal specific to the event and the organizer based on the received registration and event details with media request elements, wherein the online portal is accessible over a network.

11. The system of claim 9, wherein the shareable link to the online portal is generated in a plurality of formats by the media acquisition system for rendering the generated shareable link to the attendees of the event.

12. The system of claim 9, further comprises displaying the generated online portal on electronic devices of the attendees of the event that access the generated online portal through the generated shareable link in one of the plurality of formats.

13. The system of claim 12, wherein the media is acquired from the electronic devices of the agreeing attendees via media request elements on the displayed online portal through one of a live capture of the media and an access of stored media with an optional media enhancement.

14. The system of claim 9, wherein the analysis of the acquired media comprises organizing, enhancing, selectively highlighting, tagging, and applying image recognition to the acquired media; creating montages, three-dimensional models, and augmented reality objects from the acquired media; and exhibiting the characteristics of the acquired media.

15. The system of claim 9, further acquiring one of more of:
post-event feedback from the attendees; and
pre-event feedback from the attendees.

16. The system of claim 9, further generating a machine-readable optical code comprising the shareable link, wherein the machine-readable optical code comprises one of a quick response code and a barcode.

17. A non-transitory, computer-readable storage medium having embodied thereon, computer program codes comprising instructions executable by at least one processor for accessing media from attendees of an event, the computer program codes comprising:
a first computer program code for receiving registration and event details from an organizer of the event:
a second computer program code for generating a shareable link to an online portal, wherein the online portal is accessible by one or more electronic devices of the attendees of the event through the generated shareable link;
a third computer program code for acquiring media from the electronic devices of the attendees of the event agreeing to share the media with the organizer;
a fourth computer program code for analyzing the acquired media based on characteristics of the acquired media in accordance with preconfigured organizer preferences, wherein the preconfigured organizer preferences are part of the received event details;
a fifth computer program code for receiving an approval from the organizer for a selection of the analyzed media, wherein the organizer reviews the selection of the analyzed media prior to approving the selection of the analyzed media; and
a sixth computer program code for automatically sharing the selection of the approved media on preselected social media platforms and/or websites.

18. The non-transitory, computer-readable storage medium of claim 17, wherein the analysis of the acquired media comprises organizing, enhancing, selectively highlighting, tagging, and applying image recognition to the acquired media; creating montages, three-dimensional models, and augmented reality objects from the acquired media; and exhibiting the characteristics of the acquired media.

19. The non-transitory, computer-readable storage medium of claim 17 further comprises a seventh computer program code for generating the online portal specific to the event and the organizer based on the received registration and event details with media request elements, wherein the online portal is accessible over a network.

20. The non-transitory, computer-readable storage medium of claim 17, wherein the shareable link to the online portal is generated in a plurality of formats by the second computer program code for rendering the generated shareable link to the attendees of the event, and wherein the second computer program code is configured to generate a machine-readable optical code comprising the shareable link, wherein the machine-readable optical code comprises one of a quick response code and a barcode.

21. The non-transitory, computer-readable storage medium of claim 20, wherein the third computer program code acquires the media from the electronic devices of the agreeing attendees via media request elements on the displayed online portal through one of a live capture of the media and an access of stored media with an optional media enhancement.

22. The non-transitory, computer-readable storage medium of claim 17 further comprises a eighth computer program code for displaying the generated online portal on electronic devices of the attendees of the event that access the generated online portal through the generated shareable link in one of a plurality of formats.

23. The non-transitory, computer-readable storage medium of claim 17, wherein the third computer program code further acquires one or more of:
  post-event feedback from the attendees; and
  acquiring pre-event feedback from the attendees.

* * * * *